(12) United States Patent
Kawata

(10) Patent No.: US 6,895,423 B2
(45) Date of Patent: *May 17, 2005

(54) APPARATUS AND METHOD OF PERFORMING PRODUCT-SUM OPERATION

(75) Inventor: Shiro Kawata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 581 days.

This patent is subject to a terminal disclaimer.

(21) Appl. No.: 10/108,398

(22) Filed: Mar. 29, 2002

(65) Prior Publication Data

US 2003/0126174 A1 Jul. 3, 2003

(30) Foreign Application Priority Data

Dec. 28, 2001 (JP) ....................... 2001-398851

(51) Int. Cl.[7] ................................ G06F 7/38
(52) U.S. Cl. ..................................... 708/501
(58) Field of Search ................. 708/501, 523, 708/603

(56) References Cited

U.S. PATENT DOCUMENTS 4,754,421 A * 6/1988 Bosshart ..................... 708/625
5,182,723 A 1/1993 Kamimura
5,241,493 A * 8/1993 Chu et al. ................... 708/501
5,657,262 A * 8/1997 Curtet ........................ 708/523
5,867,413 A 2/1999 Yeh
5,880,984 A 3/1999 Burchfiel et al.

FOREIGN PATENT DOCUMENTS

| JP | 62-80764 | 4/1987 |
|---|---|---|
| JP | 4-140827 | 5/1992 |
| JP | 6-89300 | 3/1994 |
| JP | 9-146924 | 6/1997 |
| JP | 10-207693 | 8/1998 |

* cited by examiner

Primary Examiner—Chuong Dinh Ngo
(74) Attorney, Agent, or Firm—Staas & Halsey LLP

(57) ABSTRACT

To perform a product-sum operation by adding third data to a product of first data and second data, a floating point multiplier first multiplies the first data by the second data, and a bit string representing a fixed-point part in the multiplication result is divided into a portion representing more significant digits in the fixed-point part and a portion representing less significant digits in the fixed-point part. Then, a floating point adder first adds less significant multiplication result data having a bit string representing the less significant digits as a fixed-point part to the third data, and then adds the addition result to more significant multiplication result data having a bit string representing the more significant digits as a fixed-point part. A rounding process is performed on the two addition results to obtain a result of the product-sum operation.

12 Claims, 16 Drawing Sheets

|  | S: SIGN | E: EXPONENT PART | B: BIAS | F: FIXED-POINT PART | TOTAL |
|---|---|---|---|---|---|
| SINGLE PRECISION | 1 bit | 8 bit | 127 | 23 bit | 32 bit |
| DOUBLE PRECISION | 1 bit | 11 bit | 1023 | 52 bit | 64 bit |
| EXTENDED PRECISION | 1 bit | 15 bit | 16383 | 112 bit | 128 bit |

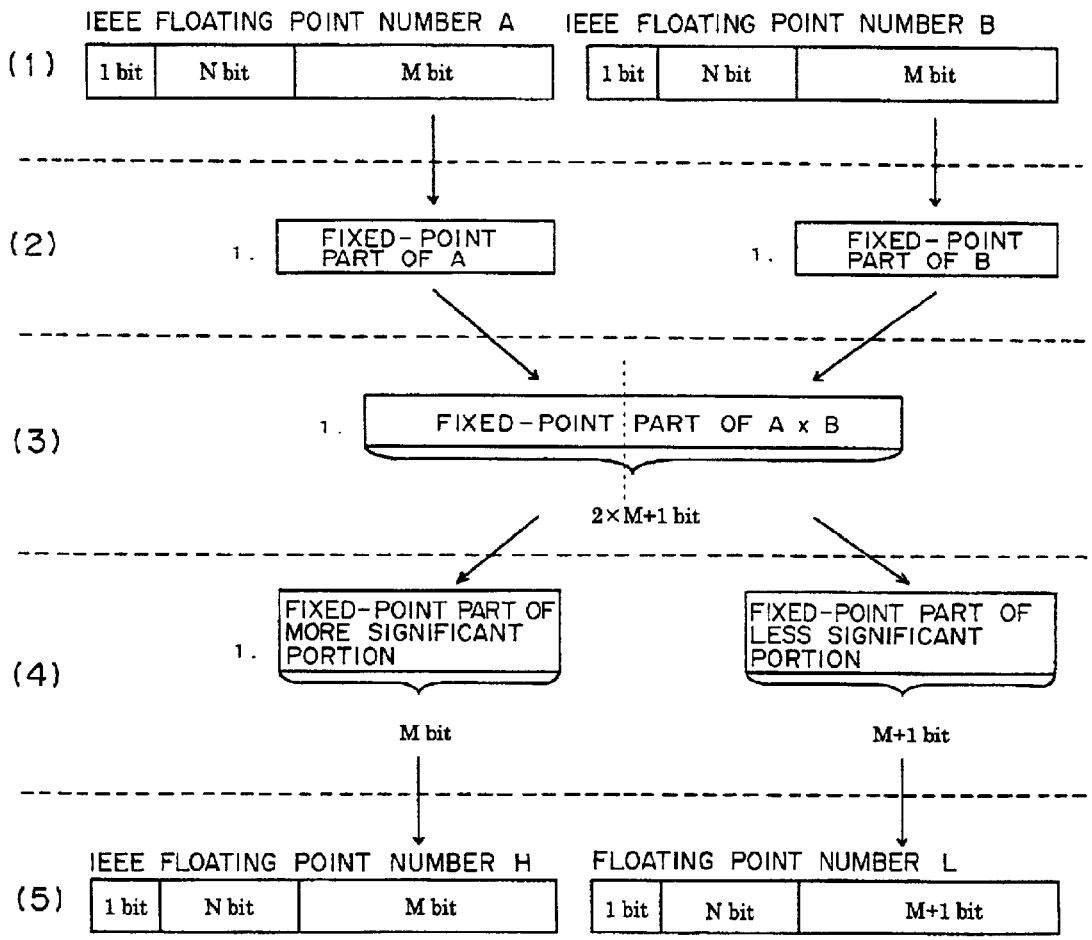
F I G. 5

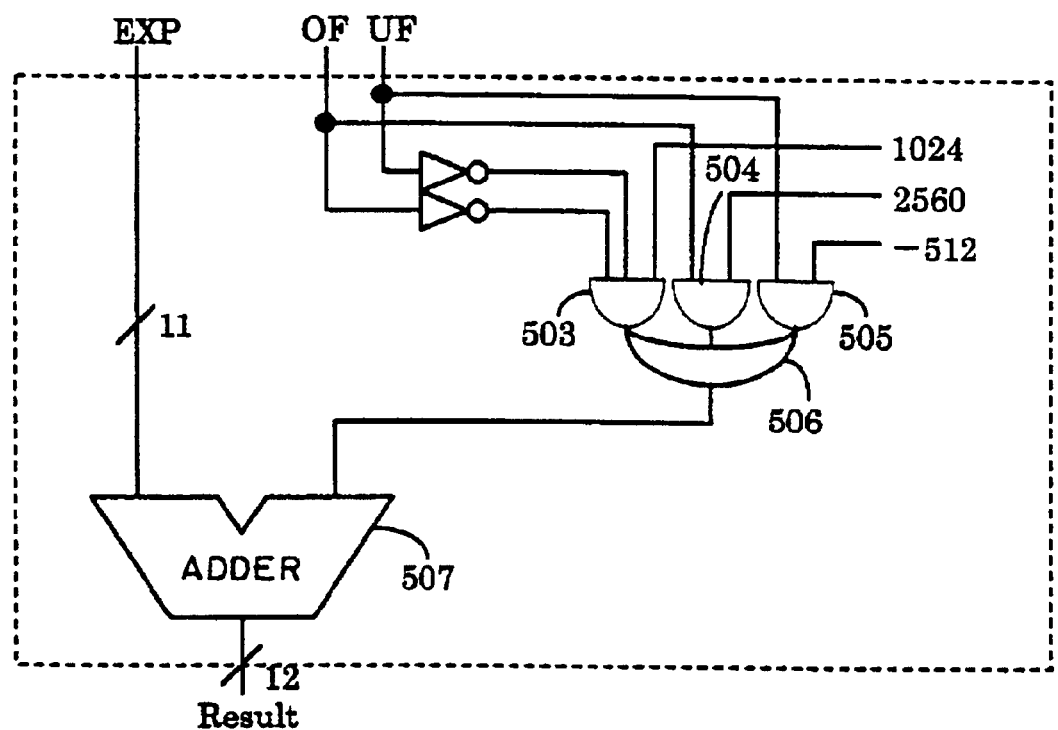
F I G. 13

APPARATUS AND METHOD OF PERFORMING PRODUCT-SUM OPERATION

BACKGROUND OF THE INVENTION

1. Field of the Invention

The present invention relates to the technology for use in an arithmetic unit for performing an arithmetic operation on digital data, and more specifically to the technology for use in an arithmetic unit for performing a product-sum operation.

2. Description of the Related Art

First, the representation form of a floating point value in the standard (IEEE-754) for a binary floating point arithmetic of the Institute of Electrical and Electronics Engineers, Inc. (IEEE) is described below by referring to FIGS. 1A and 1B.

As shown in FIG. 1A, a floating point value is formed by three fields of a sign bit S, an exponent part E, and a fixed-point part F.

The sign bit S is constantly 1-bit data indicating the plus/minus sign. '0' indicates a positive number, and '1' indicates a negative number.

The fixed-point part F indicates the value (normalized number) equal to or larger than 1.0 and smaller than 2.0. When a negative power of 2 is given in each bit, the value is represented. For example, if the first bit of the exponent part F is '1', the value of $2^{-1}$, that is, 0.5, is represented. If the second bit is '1', then the value of $2^{-2}$, that is, 0.25, is represented. The value obtained by adding 1.0 to the sum of the values represented by these bits is defined as the value of the fixed-point part. The added value of 1.0 corresponds to the value of 20 when '1' is assumed as the 0-th bit in the fixed-point part. Since '1' is constantly set for a normalized number in this bit, this bit is not actually set in the field of the fixed-point part F. However, it is processed as if it were set in the field. This bit is also called an 'implicit 1'.

The exponent part E indicates an integer of the power of 2. In the exponent part E, a biased representation is used to realize the representation of a negative value. The biased value is predetermined based on the precision of a represented floating point value.

Assuming that the biased value given by the exponent part E is B, the floating point value of X represented by S, E, F, and B is obtained by the following equation.

$$X = (-1)^S \times 2^{E-B} \times (1.0 + F)$$

FIG. 1B is a table indicating the number of bits assigned to each field and the value of bias B shown in FIG. 1A by precision defined by the represented floating point value.

The product-sum operation A×B+C about the three floating point values A, B, and C whose exponent parts are assigned N bits, and whose fixed-point parts are assigned M bits in accordance with the above mentioned IEEE Standard are performed with correct intermediate results computed.

FIG. 2 shows an example of a configuration of the conventional product-sum operation unit capable of performing the above mentioned arithmetic operation.

In FIG. 2, an adder 1001 and a fixed-point part multiplier 1002 perform the multiplication of A and B, and other circuits perform the addition of A×B and C. In this example, the signs of A, B, and C are not processed.

The adder 1001 adds the value of the exponent part (exponent value) of A to the exponent value of B. The bit width of N bits corresponding to the bit width assigned to the exponent part in the representation of the values A and B is used as input into the adder 1001 while the bit width of (N+1) bits generating no cancellation of significant digits in the addition is used as output from the adder 1001.

The fixed-point part multiplier 1002 adds the value of the fixed-point part (fixed-point value) to the fixed-point value of B. The bit width of (M+1) corresponding to the value obtained by adding 1 bit as the above mentioned implicit 1 to the bit width assigned to the fixed-point part in the representation of the values of A and B is used as input into the fixed-point part multiplier 1002 while the bit width of (2M+2) bits generating no cancellation of significant digits in the multiplication is used as output from the adder 1001.

When the arithmetic result of A×B is added to C, and when the exponent values do not match, it is necessary to first align the digits, transfer the point in one of the fixed-point values to allow the exponent values to match each other, and then perform the addition of the fixed-point values. These processes are performed by a subtracter 1003, a fixed-point part selector 1004, and an alignment circuit 1005.

The subtracter 1003 determines which is a larger exponent value, the arithmetic result of A×B or C, and obtains the amount of the transfer of the point of one of the fixed-point values by computing the difference between the values.

Based on the select signal output from the subtracter 1003, that is, the signal indicating a larger exponent value between the arithmetic result A×B and C, the fixed-point part selector 1004 outputs the fixed-point value having the larger exponent value into one input of an absolute value adder 1006, and outputs the fixed-point value having the smaller exponent value into the alignment circuit 1005. Since the fixed-point value of the arithmetic result of A×B transmitted from the fixed-point part multiplier 1002 is input into one input terminal of the fixed-point part selector 1004, the bit width (2M+2) is prepared for one input terminal of the fixed-point part selector 1004, and the bit width of the corresponding (M+1) bits obtained by adding 1 bit for implicit 1 to the bit width assigned to the fixed-point part in the representation of the value of C is prepared for the other input terminal. Since the fixed-point part of the arithmetic result of A×B can be output as is to the two output terminals of the fixed-point part selector 1004, the bit width of (2M+2) bits is prepared for the two output terminals of the fixed-point part selector 1004.

The alignment circuit 1005 transfers the point of the fixed-point value given from the fixed-point part selector 1004 according to the shift amount information output from the subtracter 1003, that is, the information about the amount of the transfer when the point of the fixed-point value of the smaller exponent value between the arithmetic result of A×B and C is transferred for alignment, and the fixed-point value after the transfer is output to the other input terminal of the absolute value adder 1006. The bit width of (2M+2) bits is prepared for the input and output of the alignment circuit 1005.

The absolute value adder 1006 performs an adding operation with the bit width of (2M+2) bits of the fixed-point values of the arithmetic result of A×B and C which are aligned.

The addition result of the fixed-point parts of A×B and C obtained by the absolute value adder 1006 can be out of bounds of the above mentioned normalized number. A normalization circuit 1007 normalizes the addition result, and the amount of transfer of the point of the fixed-point value performed for the normalization is transmitted as shift amount information to an exponent part amendment circuit

1010. The bit width of (2M+2) bits is also prepared for the input and output of the normalization circuit 1007.

A rounding circuit 1008 rounds the number of digits of the fixed-point part of (2M+2) bits output from the normalization circuit 1007 into the number of digits having valid precision, that is, in this example, a transfer from (M+1) bits indicated by the fixed-point parts of the original A, B, and C to M bits obtained by subtracting 1 bit as an implicit 1 from (M+1) described in the fixed-point part of the original A, B, and C, and outputs the result as the fixed-point part of the product-sum operation of A×B+C.

Described below is the explanation of round-up. A round-up method can be as follows.

(1) Round-down: In the arithmetic results, the bits less significant than the number of bits assigned to the fixed-point part in a predetermined numeric representation form is rounded down.

(2) Round-up: A value represented by the number of bits assigned to the fixed-point part on a predetermined numeric representation form, and a value whose absolute value is larger than and closest to the arithmetic result.

(3) Positive direction round-up: A value represented by the number of bits assigned to the fixed-point part on a predetermined numeric representation form, and a value larger than and closest to the arithmetic result.

(4) Negative direction round-up: A value represented by the number of bits assigned to the fixed-point part on a predetermined numeric representation form, and a value smaller than and closest to the arithmetic result.

(5) Average value 1: In a predetermined numeric representation form, a value which can be represented as the number of bits assigned to the fixed-point part, and is closest to the arithmetic result. If the arithmetic result cannot induce such a value, that is, if the first significant bit excluding the fixed-point part is '1', and the bits less significant are all '0', then the value indicating 0 (or 1) as the least significant bit in the fixed-point part is selected from the two closest values. The first significant bit excluding the fixed-point part refers to the bit less significant by one bit than the least significant bit in the fixed-point part assigned in a predetermined numeric representation form, which is shown in FIG. 3.

(6) Average value 2: In a predetermined numeric representation form, a value which can be represented as the number of bits assigned to the fixed-point part, and is closest to the arithmetic result. If the arithmetic result cannot induce such a value, that is, if the first significant bit excluding the fixed-point part is '1', and the bits less significant are all '0', then the value whose absolute value is larger (or smaller) is selected from the two closest values.

(7) Average value 3: In a predetermined numeric representation form, a value which can be represented as the number of bits assigned to the fixed-point part, and is closest to the arithmetic result. If the arithmetic result cannot induce such a value, that is, if the first significant bit excluding the fixed-point part is '1', and the bits less significant are all '0', then a larger (or smaller) value is selected from the two closest values.

As described above, the rounding operation can be performed in a number of methods, and can be selected based on the use of an arithmetic result.

Back in FIG. 2, a selector 1009 selects a larger exponent value between the arithmetic result of A×B and C, that is, the reference exponent value in the addition of fixed-point values performed by the absolute value adder 1006, according to the select signal output from the subtracter 1003.

The exponent part amendment circuit 1010 amends the exponent value selected by the selector 1009 according to the shift amount information transmitted from the normalization circuit 1007, transfers it into a value of N bits assigned for the exponent part in the numeric representation form, and outputs the result as an exponent value of the product-sum operation result of A×B+C.

The product-sum operation unit shown in FIG. 2 performs the product-sum operation of A×B+C as described above.

As described above, to perform the above mentioned product-sum operation on A×B+C without limiting the probable exponent value or fixed-point value for each of A, B, and C, the precision of at least (2M+2) bits is required for a fixed-point part, and the precision of at least (N+1) bits is required for an exponent part for use in a multiplication result. Furthermore, the multiplication result A×B is to be used as an operand of the next addition. Therefore, if a general purpose arithmetic unit is able to perform the product-sum operation, it is necessary for the unit to be provided with the (N+1) bit exponent part subtracter 1003, the exponent part amendment circuit 1010 from (N+1) bits to N bits, the (2M+2) bit fixed-point part selector 1004, the (2M+2) bit alignment circuit 1005, the (2M+2) bit absolute value adder 1006, the (2M+2) bit normalization circuit 1007, and the rounding circuit 1008 only for the above mentioned purpose as shown in FIG. 2, thereby giving a heavy load on the circuit implementation.

Other technologies of performing a product-sum operation using an existing arithmetic unit has been disclosed (for example, Japanese Patent Publication No.10-207693). However, in these technologies, the case in which an arithmetic result requires normalization, the case, in which a carry-out from a fixed-point part occurs in the addition of the multiplication result of A×B to C, etc. are considered special cases, and special processes are performed to process the special cases. Since performing the special processes generates a long latency in an arithmetic operation, inappropriate arithmetic operations are included in these technologies. For example, when a remainder is continuously obtained when a dividend is divided by a divisor, an integer part Z of the quotient obtained by dividing a dividend X by a divisor Y is to be first obtained, and then the computation of X−Z×Y is performed to obtain the remainder. In the arithmetic operation, since a normalizing process is performed with a high probability especially after performing a dividing operation, most of these processes are exception processes, thereby prolonging the latency in arithmetic operations.

SUMMARY OF THE INVENTION

The present invention has been developed to solve the above mentioned problems, and aims at realizing an arithmetic unit having a sufficient arithmetic system in performing a floating point number product-sum operation with a smaller number of additional circuit components.

The product-sum operation unit which is one of the aspects of the present invention supposes an apparatus for performing a product-sum operation by multiplying and adding floating point number data representing a floating point number using a bit string, and includes: a multiplication unit for performing a multiplication on the floating point number data; an addition unit for performing an addition on the floating point number data; a rounding unit for performing a rounding process on the floating point number data obtained as a result of the addition performed by the addition unit; a result storage unit for storing a result of the product-sum operation by adding third data which is floating point number data to a product of first data and second data which are floating point number data; a multiplication control unit for allowing the multiplication unit to compute multiplication result data which is a result of the multiplication of the first data and the second data; a first addition control unit for allowing the addition unit to compute first addition result data obtained by adding the third data to less significant digit multiplication result data having a fixed-point part formed by a bit string representing the less significant digits in two divisions obtained by dividing a bit string representing the fixed-point part of the multiplication result data into more significant digits and less significant digits; and a second addition control unit for allowing the addition unit to compute second addition result data obtained by adding more significant digit multiplication result data having a fixed-point part formed by a bit string representing more significant digits to the first addition result data. The result storage unit stores first product-sum operation result data which is floating point number data obtained by the rounding unit performing a rounding process on the second addition result data, thereby successfully attaining the above mentioned aim.

The representation form of the floating point number data can be, for example, based on the IEEE-754 Standard which is a standard for a binary floating point arithmetic operation of IEEE (the Institute of Electrical and Electronics Engineers, Inc.)

With the above mentioned configuration, the multiplication result of first data and second data is divided into two divisions, that is, data having a fixed-point part formed by more significant digits in the fixed-point part of the multiplication result and data having a fixed-point part formed by less significant digits in the fixed-point part of the multiplication result, and these data are added to the third data are added to the third data in two adding operations. As a result, the circuit of the addition unit can be smaller than that used when the bit width of a multiplication result is input as is into the addition unit, and the bit width of a bus for transferring data from the multiplication unit to the addition unit can be reduced, considerably reducing the circuit size.

In addition, since the data having the fixed-point part formed by less significant digits in the fixed-point part of the multiplication result is first added to the third data in the sequence of an addition performed by the addition unit, the less significant digits of the third data which can be lost if the fixed-point part is aligned during the addition of first adding the data having the fixed-point part formed by the more significant digits in the fixed-point part of the multiplication result to the third data can be protected from being lost, thereby guaranteeing satisfactory precision.

The product-sum operation unit according to the above mentioned present invention can also be configured to include: a third addition control unit for allowing the addition unit to compute third addition result data obtained by adding the third data to the more significant digit multiplication result data; a fourth addition control unit for allowing the addition unit to compute fourth addition result data obtained by adding the less significant digit multiplication result data to the third addition result data; and a comparison unit for comparing the more significant digit multiplication result data with the third data. The result storage unit stores second product-sum operation result data which is floating point number data obtained by the rounding unit performing a rounding process on the fourth addition result data in place of the first product-sum operation result data based on the comparison result obtained by the comparison unit.

When it is necessary to normalize data in performing an addition after obtaining the second addition result data by adding the first addition result data to the more significant digit multiplication result data, the information about the value of the less significant digit rounded down for alignment in the addition previously performed to compute the first addition result data is required. However, when a sum is obtained in this order, the value of a less significant digit is lost in an adding operation to be performed later. Therefore, it is first determined using the comparison unit whether or not such a case can occur. If yes, then the addition for obtaining the third addition result data is first performed using the more significant digit multiplication result data and the third data, and the addition for obtaining the fourth addition result data is performed later using the third addition result data and the less significant digit multiplication result data, thereby solving the problem.

The result storage unit can also be configured to store the first product-sum operation result data if the comparison result from the comparison unit indicates that the more significant digit multiplication result data matches the third data in sign.

If the comparison result from the comparison unit indicates that the more significant digit multiplication result data is different from the third data in sign, and if the comparison result indicates that the value of the exponent part represented by the more significant digit multiplication result data matches the value of the exponent part of the third data, or if the difference between the value of the exponent part represented by the more significant digit multiplication result data and the value of the exponent part of the third data is 1, and the most significant bit of the bit string representing the fixed-point part having a larger value of an exponent part in the more significant digit multiplication result data and the third data is 0, then the second product-sum operation result data is stored in the result storage unit. Otherwise, the result storage unit stores the first product-sum operation result data.

The product-sum operation unit according to the present invention can also be configured by further including an exponent part conversion unit for converting by extending the number of bits assigned for representation of an exponent part in floating point number data indicating a result of a multiplication by the multiplication unit or a result of an addition by the addition unit according to the information indicating that an overflow or an underflow has occurred in the multiplication or the addition. If an addition target processed by the addition unit is data indicating the result of the multiplication performed by the multiplication unit or the result of the addition performed before by the addition unit, then the addition unit adds the data assuming that the value obtained after the conversion by the exponent part conversion unit is the value of the exponent part in the data.

With the configuration, although the range of the exponent value represented by an addition result or a multiplication result is limited output by the multiplication unit and the addition unit respectively, the influence of precision deterioration on the product-sum operation can be reduced.

Furthermore, the above mentioned product-sum operation unit according to the present invention can also be configured by: the addition unit outputting rounding process information which is information based on which the rounding process can be performed by the rounding unit to the floating point number data obtained by a result of an addition performed by the addition unit together with the addition result; and the rounding unit performing the rounding process according to first rounding information output when the addition unit computes the first addition result data and second rounding information output when the addition unit computes the second addition result data when the rounding process is performed on the second addition result data.

The configuration is designed such that, for example, rounding information has in the values of any fixed-point part in the two pieces of floating point number data to be added by the addition unit, a guard bit which is the most significant bit in the bit string rounded down in the alignment performed when the values of the fixed-point parts are added; a round bit which is a second significant bit preceded by the most significant bit; and a sticky bit indicating a logical sum of all bits subsequent to the second significant bit, and that the rounding unit can perform the rounding process based on a logical sum of the guard bit in first rounding information and the guard bit in second rounding information; a logical sum of the round bit in the first rounding information and the round bit in the second rounding information; and a logical sum of the guard bit, the round bit, and the sticky bit of the first rounding information and the sticky bit of the second rounding information when the rounding process is performed on the second addition result data.

With the configuration, the multiplication result of the first data and the second data is divided into two divisions, that is, the data having the more significant digits of the fixed-point part as a fixed-point part, and the data having the less significant digits of the fixed-point part as a fixed-point part. These two pieces of data are added to the third data in two arithmetic operations, thereby removing the influence of the rounding unit on the rounding process, and preventing the degraded precision of a product-sum operation result caused by the influence.

Another aspect of the product-sum operation method according to the present invention is based on the method of performing a product-sum operation by adding third data which is floating point number data to a product of first data and second data which are floating point number data representing a floating point number by a bit string, and includes the steps of: allowing a multiplication unit for multiplying floating point number data to multiply first data by second data; allowing an addition unit to add floating point number data by adding the third data to less significant digit multiplication result data having as a fixed-point part a bit string representing less significant digits in two divisions obtained by dividing a bit string representing a fixed-point part of more significant digit multiplication result data obtained as a result of the multiplication into two divisions, that is, a bit string indicating more significant digits and less significant digits; and allowing the addition unit to compute the second addition result data obtained by adding more significant digit multiplication result data having as a fixed-point part the bit string representing more significant digits to the first addition result data which is a result of the addition; thereby obtaining as a result of the product-sum operation the data obtained by performing a rounding process on the second addition result data. Thus, the above mentioned problems can be solved by obtaining the operations and effects similar to those of the product-sum operation unit according to the present invention.

BRIEF DESCRIPTION OF THE DRAWINGS

The present invention will be more apparent from the following detail of description when accompanying drawings are referenced.

FIG. 5 shows the division of a fixed-point value in a multiplication result value;

FIG. 13 shows the detailed configuration of the exponent part conversion circuit shown in FIG. 12;

DESCRIPTION OF THE PREFERRED EMBODIMENTS

Figures 1A, 1B:
FIG. 1A shows a representation form of a floating point value according to the IEEE Standard.
FIG. 1B shows the correspondence between the precision and the bit width in the representation of a floating point value according to the IEEE Standard.

The embodiments of the present invention are described below by referring to the attached drawings.

First described below is the principle of an embodiment of the present invention. In the following explanation, the arithmetic unit according to the IEEE Standard for performing a product-sum operation A×B+C on the three floating point numbers A, B, and C whose exponent parts are assigned N bits, and whose fixed-point parts are assigned M bits are realized by improving the existing IEEE floating point number arithmetic unit.

First, the multiplication unit for performing a multiplication on operands A and B input into the unit.

Although the fixed-point part of the value input into the multiplication unit is M bits, one implicit bit to be followed by the most significant bit of the fixed-point part is omitted in the representation form of the IEEE floating point number. Therefore, (M+1) bits with the implicit bit included is actually processed as a target of a fixed-point value multiplication. The arithmetic result obtained by a multiplier in the multiplication unit is represented by (2M+2) bits. However, in accordance with the representation form of an IEEE floating point number, one bit as an implicit bit is removed from the representation. Therefore, the fixed-point part of the arithmetic result output from the multiplier has (2M+1) bits.

In the multiplication unit of the existing floating point number arithmetic unit, the rounding process can be performed inside the circuit on the fixed-point value as described above. Accordingly, an arithmetic result of the number of bits may not be output. However, even such a multiplication unit normally obtains a correct multiplication result of (2M+2) bits in the internal multiplier. Therefore, such a multiplication unit can obtain a fixed-point value of an arithmetic result if a multiplication result at this stage can be retrieved.

On the other hand, in the multiplication unit, the arithmetic operation on the exponent part of the operands A and B is an addition of numbers of N bits, and the result can be represented by (N+1) bits. However, to obtain the output of the arithmetic unit according to the present invention as an exponent value of (N+1) bits not in accordance with the representation form of an IEEE floating point number on the product-sum operation A×B+C, it is necessary to make an appropriate change to the arithmetic unit provided at the stage after the multiplication unit.

If the multiplication unit outputs an exponent value of N bits in the representation form of an IEEE floating point number, a circuit is provided prior to a stage for adding A×B to C to obtain an exponent value of (N+1) bits by performing the following operations using an exponent value of N bits in an arithmetic result, and a signal indicating an exponent overflow and exponent underflow output from the multiplication unit.

Normally, an amendment is made to an exponent value of an arithmetic result which is an output when an exponent overflow or an exponent underflow occurs. In the amendment to the exponent, a floating point number which cannot be represented by a predetermined number of bits of an exponent part is divided or multiplied by a constant β to adjust the exponent. When an exponent overflow occurs, the value is divided by β. When an exponent underflow occurs, the value is multiplied by β. The β is set to a value which the possible exponent value when an exponent overflow or an exponent underflow occurs can be represented by a predetermined number of bits for.

Described below is a practical method of obtaining an exponent value extended into (N+1) bits using the exponent value of N bits after performing an exponent amending process is performed in the above mentioned multiplication unit, and a signal of an overflow or an underflow output from the multiplication unit. In this method, the above mentioned biased value assigned to an exponent value is also altered depending on the number of bits assigned to the exponent part.

Assuming that an exponent value of N bits including the bias before conversion is E1, an exponent value of (N+1) bits including the bias after the conversion is E2, the bias of N bits before the conversion is B1, the bias of (N+1) bits after the conversion is B2, and the constant β used in the exponent amending process performed by the multiplication unit is $2^\alpha$ (where α is a value of N bits), the following conversion expressions of exponent values are represented.

when an overflow occurs:

$$E2=E1+(-B1+B2+\alpha)$$

when an underflow occurs:

$$E2=E1+(-B1+B2-\alpha)$$

when no overflow or underflow occurs:

$$E2=E1+(-B1+B2)$$

These equations are hereinafter referred to as 'exponent value conversion expressions'.

In these exponent value conversion expressions, a value of N bits is assumed to be a value of (N+1) bits having the most significant bit of 0, and an addition and a subtraction are performed using (N+1) bits. Since the values in the parentheses on the right side are all constants in the above listed equations, the arithmetic operations in the parentheses are performed in advance when performing the conversion using the exponent values. Thus, a result can be obtained only by adding a constant obtained in the arithmetic operation to the exponent value before the conversion.

Figure 4:
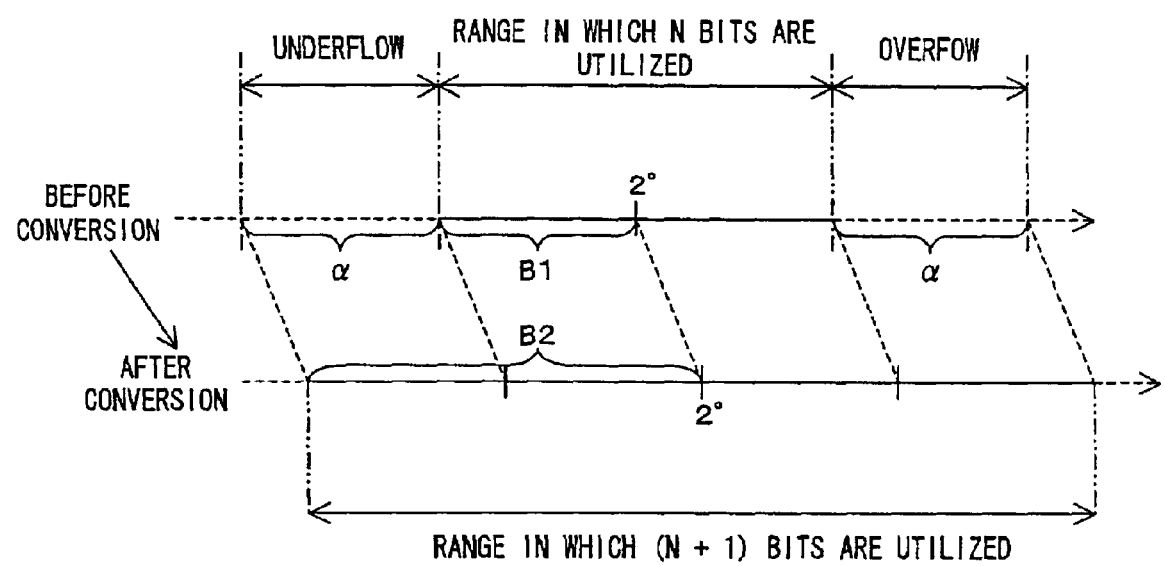
FIG. 4 shows the conversion of an exponent value.

The range of the value which can be represented by the exponent value of (N+1) bits obtained in the conversion can be considerably extended from the range of the value which can be represented by the exponent value of N bits before the conversion as shown in FIG. 4.

Described below is the circuit for adding A×B to C.

The input of the exponent part in the addition unit of the existing IEEE floating point number arithmetic unit normally has the bit width of N bits. However, after the above mentioned amendment, the number of bits of the exponent part in the arithmetic result output from the multiplication unit has been increased by 1 bit from the normal number of bits. Therefore, the addition of A×B to C cannot be performed as is. Accordingly, the addition unit has to be amended.

First, the subtracter (circuit corresponding to the subtracter 1003 shown in FIG. 2) for comparing a value of A×B to C, and for obtaining the shift amount for alignment of a fixed-point value is adjusted for input of (N+1) bits.

Then, the (2M+1) bit fixed-point part of the value of the multiplication result of A×B is simply divided into an M bit more significant portion and a (M+1) bit less significant portion, which are fixed-point parts respectively of the floating point numbers H and L having the same precision. Since using a (2M+1) bit adder as a circuit of adding fixed-point values of the arithmetic result of A×B and C increases the circuit components, the fixed-point part of the arithmetic result of A×B is divided into a more significant portion and a less significant portion in advance, and each portion is added to the fixed-point value of C, thereby avoiding the increase of the circuit components.

However, the fixed-point value of L is obtained only by truncating the less significant portion of the fixed-point value of the multiplication result, the representation form of the IEEE floating point number cannot be obtained as is. To realize the representation form of an IEEE floating point number, a left shift is performed such that the leftmost portion of the less significant portion of (M+1) bit data, that is, the value one digit more significant than the most significant bit, can be an implicit 1, and the implicit 1 has to be cut off.

It is not necessary to give any change to the exponent part of (N+1) bits in the value of the multiplication result of A×B for the exponent part of H. However, the exponent part of L has to be amended in the value depending on the left shift amount performed on the fixed-point part. At this time, the exponent value of L can be obtained by the following equation using Z as the amount of left shift performed on the fixed-point part.

(exponent value of $L$)=(exponent value of $H$)−($M$+1+$Z$)

where the exponent value of L can be negative when the exponent value of H is equal to or smaller than M+1. In this case, the exponent value of L is set to 0. With the settings, L is different from the actual value, but subsequent correct operations can be guaranteed, which is explained below.

The exponent parts of H and L are assigned (N+1) bits, and the biased value is currently B2. In addition, the exponent part of C is assigned N bits, and the biased value is B1.

Assuming that the exponent value of C is '0' indicating the smallest possible value, and the exponent value of H is 'M +1', the difference between the exponent values of C and H is computed as follows.

$$(0-B1)-(M+1-B2)=B2-B1-M-1$$

Normally, since a biased value is almost half of the largest possible value of the exponent value, the value is substituted for B1 and B2 in the above mentioned equation, and the following equation is set up.

$$B2 - B1 - M - 1 \cong (2^{N+1} - 1)/2 - (2^N - 1)/2 - M - 1$$

$$= 2^{N-1} - M - 1$$

Using the values on the table shown in, for example, FIG. 1B, the values are 104 for single-precision, 971 for double-precision, and 16271 for extended precision. That is, although C is the smallest possible value in the precision, the arithmetic result of A×B is sufficiently smaller than C and can be ignored if the exponent value of H equals M or smaller. That is, an arithmetic result of A×B+C is obtained with A, B, and C defined as having the same precision, and a small difference in the exponent values of L is not significant.

The circuit for performing the above mentioned data manipulation is added to the addition unit.

FIG. 5 shows the above mentioned operations of dividing a fixed-point value of the value of a multiplication result of A×B.

In FIG. 5, (1) indicates the floating point numbers A and B in accordance with the IEEE standard which are assigned N bits for the exponent part and M bits for the fixed-point part. (2) indicates the fixed-point parts extracted from the respective numbers and assigned an implicit 1. The fixed-point part of the multiplication result is represented by the implicit 1 and (2M+1) bits as indicated by (3). Then, as indicated by (4), the fixed-point part is divided into an M bit more significant portion and an (M+1) bit less significant portion. Then, as indicated by (5), the more significant portion becomes a floating point number H in accordance with the IEEE Standard, the less significant portion is bit shifted to the left with the implicit 1 removed, and becomes a floating point number L in accordance with the IEEE Standard with the implicit 1 removed. However, the fixed-point part of L is assigned (M+1) bits, and the value of the exponent part of L is amended depending on the amount of bit shift.

Described below is the adder for adding the arithmetic result of A×B to C.

As described above, the adder performs an addition on the three floating point numbers C, H, and L in two arithmetic operations. Since the addition unit of an existing floating point number arithmetic unit only corresponds to the addition for (M+1) bits including the implicit 1, the values of the digits less significant than the digits which can be represented by (M+1) bits is rounded and truncated when an addition is performed by the addition unit. Therefore, according to the present invention, an adding operation is first performed on L as a rule. That is, according to the present embodiment, the addition of C and L is normally performed first, and the result is added to H later.

However, when it is necessary to perform a normalizing operation during the addition to be performed later, the information about the value of a less significant digit truncated in the rounding process in the addition performed on C is required. If a sum is obtained in the above mentioned sequence, the value of a less significant digit has already been. Therefore, it is first determined whether or not such a case occurs. If yes, an addition is performed in the inverse order. That is, according to the present embodiment, the addition of C and H is performed first in this case, and the result is later added to L.

Described below are the details of the above mentioned method.

The common operations are described first. If H and C have the same signs, or if H and C have different signs and the difference between the exponent value of H and the exponent value of C is 1 or more (except when the difference between the exponent value of H and the exponent value of C is 1 and the most significant bit of the larger fixed-point value between H and C is 0), then the fixed-point values in an addition result value are not normalized, or they are normalized by only a 1-bit shift although the normalization is performed, thereby requiring no special process. In this case, an addition of L and C is first performed, and then the result is added to H.

Figure 6:
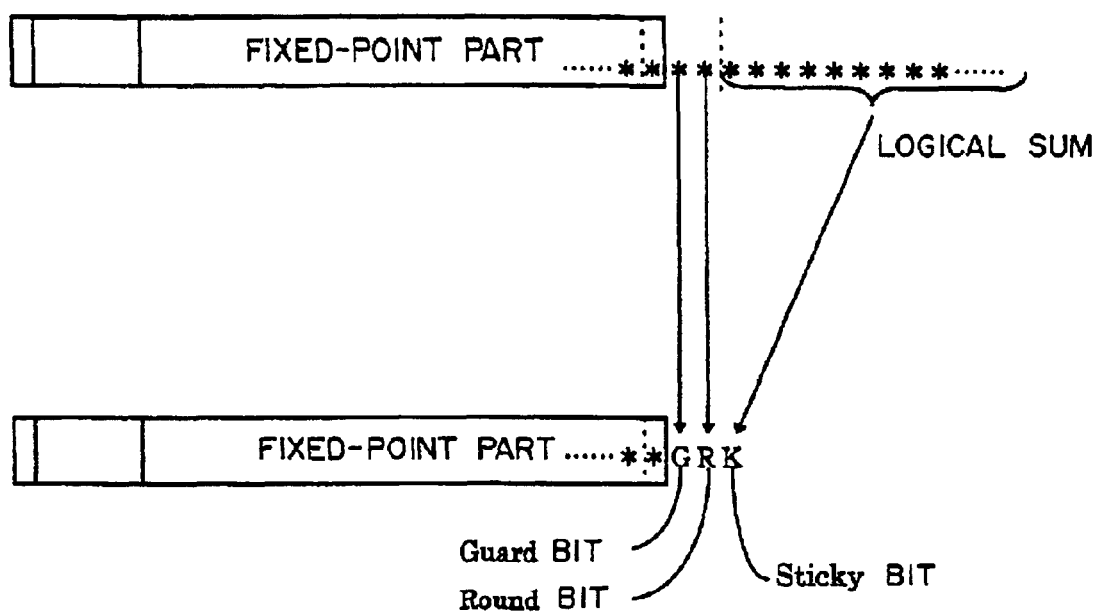
FIG. 6 shows each bit of G, R, and K.

The adder for performing the above mentioned addition is configured to output a G bit (also referred to as a guard bit) which is the first bit less significant than the least significant bit of the fixed-point part, an R bit (also referred to as a round bit) which is the second bit, and a K bit (also referred to as a sticky bit) which is a logical sum of all bits including and subsequent to the third bit) as an intermediate result of the adding operation as shown in FIG. 6.

Since a common addition unit outputs a result of the rounding process performed on a fixed-point value of an arithmetic result based on the GRK bits, the arithmetic result does not include the values of GRK. However, the adder used in the present embodiment is configured to output a fixed-point value of an addition result before the rounding process, and the existing IEEE floating point number arithmetic unit is also amended to output the value of each bit of GRK. Each bit of GRK can be obtained when a bit is shifted for alignment of one of the two fixed-point values to be added.

The first addition result, that is, the addition result of L and C, is set as P. P is formed by an exponent value of N bits, a fixed-point value of M bits, and each bit of GRK. Originally, the value of P is to be configured such that a fixed-point value can be set without a limit for a bit width. However, considering the requirements for the circuit size, P is assigned a value of each bit of GRK. At this time, the exponent value is an N-bit value so that the exponent value can be amended using the existing IEEE floating point number arithmetic unit as is. Therefore, it is also necessary to perform the conversion into (N+1) bits just as the exponent value of the arithmetic result from the above mentioned multiplication unit is converted.

Then, P and H whose exponent values have been converted into (N+1) bits are input into the same adder as in the previous adding operation to obtain the second addition result.

When the exponent value of P is larger than the exponent value of H, an alignment process is performed on the fixed-point value of H, and each bit of GRK is generated for H. Each bit of GRK of H is referred to as G', R', and K'.

In this case, P also has GRK in the first adding operation performed before. Thus, if GRK exists in both operands, the operation cannot be successfully performed because a carry-over from the bits of the third and subsequent less significant digits following the least significant bit of the fixed-point part which is the base of K bits cannot be predicted.

For example, if X+Y is obtained where X has the least significant and subsequent bits of the fixed-point part of 10110 . . . in binary, and Y has the bits 00100 . . . , then the values of the least significant and subsequent bits of the fixed-point part of the addition result are 11010 . . . . At this time, the values of the bits of GRM relating to X, Y, and X+Y are '101', '001', and '111'.

Similarly, when X'+Y' is obtained where the value X' whose fixed-point part has the least significant and subsequent bits of 10010 . . . in binary, Y' having the bits of 00010 . . . , then the values of the least significant and subsequent bits of the fixed-point part of the addition result are 10100 . . . At this time, the values of the bits of GRM relating to X', Y', and X'+Y' are '101', '001', and '101'.

That is, the value of each bit of GRK of X and X', and Y and Y' is the same, but the value of each bit of GRK of X+Y, and X'+Y' is different from each other. The result comes from the carry-over from the digit of the base of the K bit for X+Y while no carry-over from the digit for X'+Y'. The presence/absence of the carry-over cannot be predicted without holding correct values of and subsequent to the fixed-point part.

However, no carry-over is guaranteed in the present computation as follows.

When the exponent value of P is larger than the exponent value of H in the floating point numbers C, H, and L, C is the largest, followed by H and L in this order.

Figure 7:
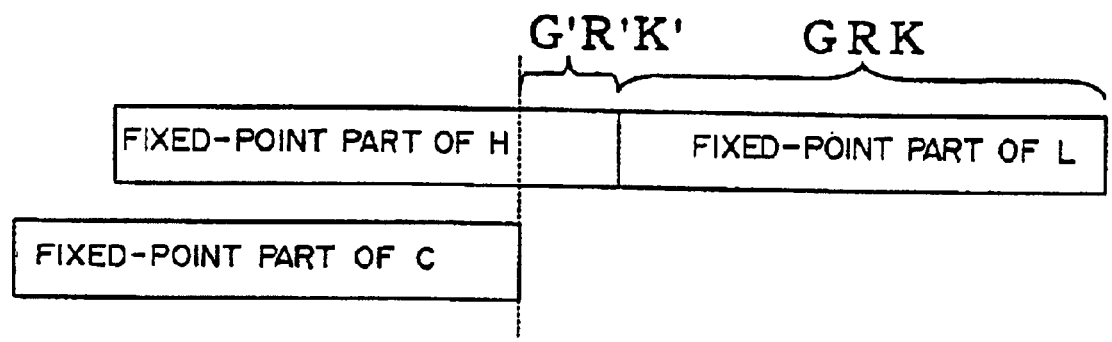
FIG. 7 shows the correspondence among C, H, and L when the exponent value of P is larger than the exponent value of H.

Considering the correspondence between the numbers of digits assigned to C and H, the fixed-point values of C, H, and L in this case can be shown in FIG. 7. That is, P is a first addition result, that is, a sum of L and C. Therefore, the fixed-point value of P is the value equal to the fixed-point value of C as is. At this time, each bit of GRK of P is generated based on the fixed-point value of L.

Since P is larger than H, the fixed-point value of H is right shifted for alignment in the second addition. Therefore, G' R' K' is generated based on the portion of the least significant and subsequent bits of the fixed-point part of H.

Since H and L are obtained by dividing the fixed-point value of the value of the arithmetic result of A×B into two portions, the digits of the fixed-point values of H and L do not overlap in the same digit position. Furthermore, as described above, since each bit of GRK is generated from L while each bit of G' R' K' is generated from H, the bits of these GRK and G' R' K' do not overlap (refer to FIG. 7).

As described above, in adding up P and H, no carry-over occurs from the base digit of K bits, and no carry-over occurs from G and R. Therefore, the final value (referred to as G", R", and K") of each bit of GRK of the value of the second addition result can be obtained in the operation of G"=G'∪G, R"=R'∪R, K"=K'∪K.

The value of each bit of G"R"K" is obtained in the above mentioned logical operation, the rounding process is performed on the value of the second arithmetic result based on the obtained values, and the result is output as the final result of the product-sum operation of A×B+C.

When the exponent value of H is larger than the exponent value of P, then the alignment is performed on P, and the value of each bit of new GRK is generated. The subsequent computation is performed as a rounding process on the result of the adding operation based on the value of each bit of newly obtained GRK as in the normal addition, thereby obtaining the final result of the product-sum operation.

Described below is the case different from the above mentioned normal case in which, H and C have different signs and the exponent value of H is equal to the exponent value of C, or H and C have different signs and the difference between the exponent value of H and the exponent value of C is 1, and the most significant bit of the larger fixed-point value between H and C is 0.

In the above mentioned case, it is necessary to normalize 1 bit or more when the arithmetic result of A×B is added to C.

If L is first added to C in this case, then the rounding process performed on the arithmetic result in the first addition, and the normalizing process performed on the arithmetic result of the sum of the subsequent first addition result and H cause the necessary information required to maintain predetermined precision to be lost. Therefore, the first addition result P formed by N-bit exponent part and M-bit fixed-point part is first obtained by inputting H and C into the above mentioned adder following the above mentioned process steps of the common case in reverse. In the first addition, 1 or more bits are normalized. However, since the difference between the exponent values of the two operands is equal to or smaller than 1, a bit shift is not made for alignment, thereby generating no GRK. Therefore, in the second addition of P and L, the (N+1)-bit conversion result from the exponent part of the first arithmetic result P and L are input into the same adder as in the first addition to obtain the second addition result and the value of each bit of GRK at the time. Then, the rounding process is performed on the second arithmetic result based on the GRK, and the resultant value is set as the final result of the product-sum operation.

Described below is an example of the practical configuration of the arithmetic unit capable of performing the product-sum operation according to the above mentioned principle.

Figure 8:
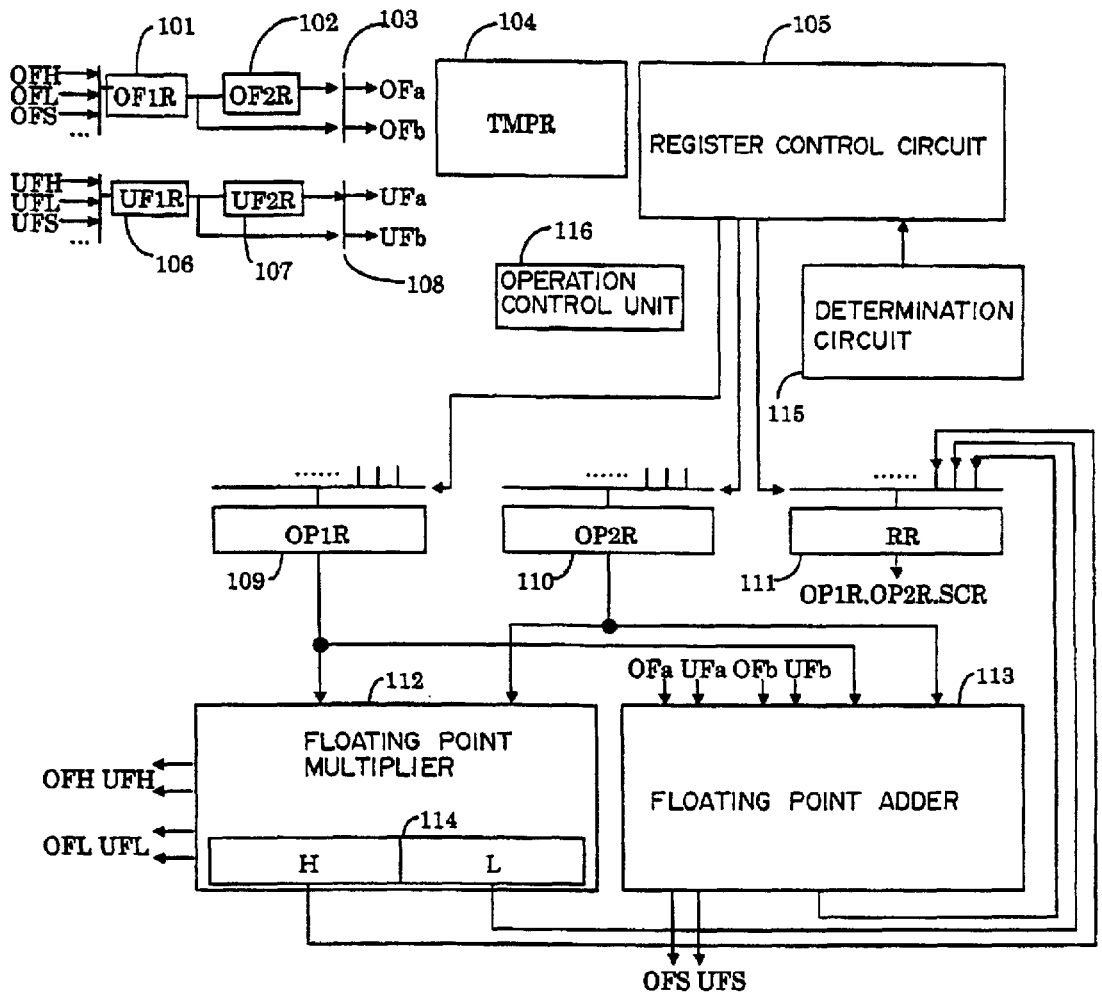
FIG. 8 shows the configuration of the arithmetic unit embodying the present invention.

FIG. 8 shows the configuration of the arithmetic unit according to the present invention. The arithmetic unit performs the product-sum operation of A×B+C on the three floating point numbers A, B, and C of a 1-bit sign, 11-bit exponent part, and a 52-bit fixed-point part, that is, 64-bit numbers, in accordance with the standard of the IEEE double-precision floating point number based on the above mentioned principle. For simple explanation, it is assumed that the arithmetic result of A×B matches C in sign.

An OP1R (OP1 register) 109 and an OP2R (OP2 register) 110 store numeric data to be input into a floating point multiplier 112 or a floating point adder 113. Between them, the OP1R 109 is configured to have a bit width of 64 bits. The bit width of the OP2R 110 is described later.

An RR (result register) 111 stores numeric data as an arithmetic result output by the floating point multiplier 112 or the floating point adder 113.

The selection of the numeric data to be stored in each of the registers OP1R 109, OP2R 110, and RR 111 is controlled by a register control circuit 105.

When an arithmetic operation of A×B is performed, the floating point multiplier 112 can be operated at a multiplication instruction with the values of A and B stored in the OP1R 109 and the OP2R 110.

Figure 9:
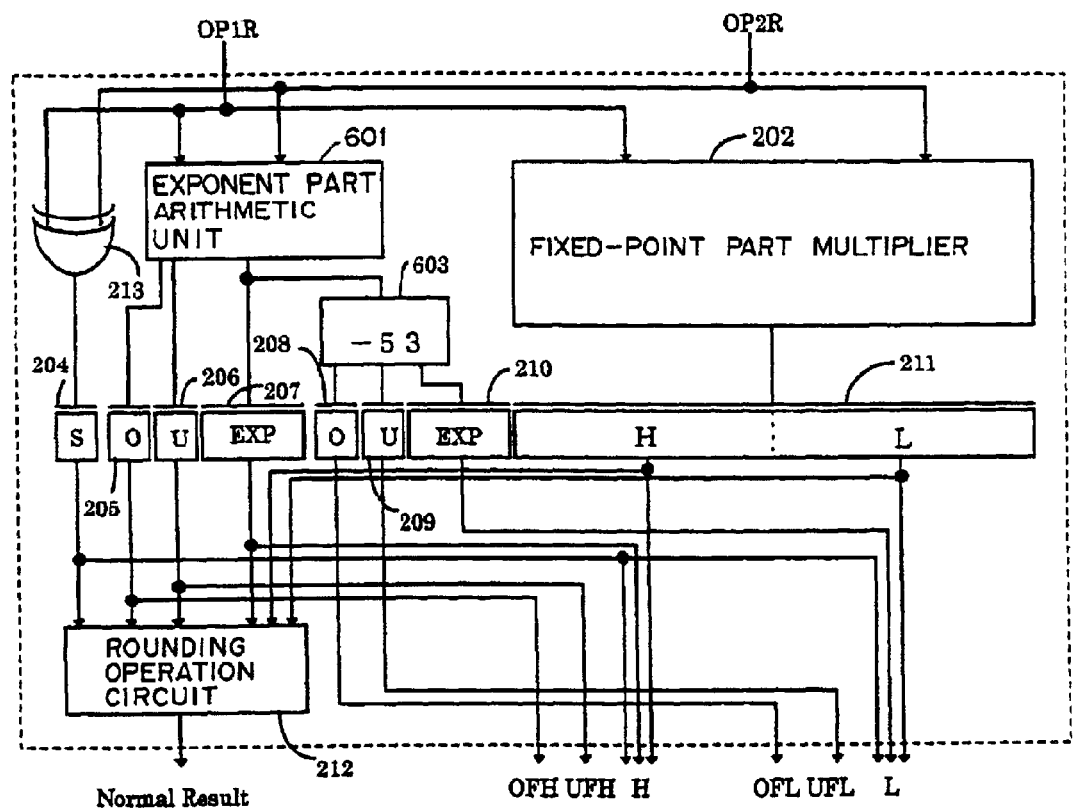
FIG. 9 shows the detailed configuration of the floating point multiplier shown in FIG. 8.

Described below is the operation by referring to FIG. 9. FIG. 9 shows the detailed configuration of the floating point multiplier 112 shown in FIG. 8. The floating point multiplier 112 corresponds to the multiplication of IEEE floating point numbers, and a fixed-point part multiplier 202 computes a correct multiplication result for fixed-point parts, and includes a fixed-point part multiplication result register 211.

In the normal multiplication, the data stored in the fixed-point part multiplication result register 211 is transmitted to a rounding operation circuit 212, processed in a rounding operation, and only the more significant 53-bit numeric data including the implicit 1 is output as a fixed-point value. The remaining less significant bit data is discarded. On the other hand, in the product-sum operation of A×B+C performed on the floating point numbers A, B, and C, no rounding process is performed by the rounding operation circuit 212 on the data stored in the fixed-point part multiplication result register 211, and a bus for outputting, not discarding, the above mentioned less significant bit data is added to the fixed-point part multiplication result register 211.

Practically, the floating point value data H of the 52-bit fixed-point part data obtained by subtracting the implicit 1 from the more significant 53 bits in the 106-bit data stored in the fixed-point part multiplication result register 211, and the floating point value data L of the less significant 53-bit fixed-point part data in the data stored in the fixed-point part multiplication result register 211 are output, and the output of H and L are stored in the RR 111 in two operations.

The sign bits of H and L receive the value of exclusive logical sum about the sign bit in the data stored in the OP1R 109 and the OP2R 110 stored in the S register (sign register) 204 after being obtained by an Ex-OR (Exclusive-OR) 213.

The exponent part of H receives the addition result of the exponent values in the data stored in the OP1R 109 and the OP2R 110 obtained by an exponent part arithmetic unit 201 and stored in the more significant data exponent value register 207. Furthermore, the exponent part of L receives a value obtained by subtracting 53 from the addition result of the exponent value in the data stored in the OP1R 109 and the OP2R 110, obtained by an adder 203 and stored by a less significant data exponent value register 210. The addition of −53 by the adder 203 is performed to align the value of L based on the value of H.

Thus, H and L are obtained as described above. In FIG. 8, the floating point multiplier 112 includes a multiplication result register 114, and a multiplication result of H and L is stored in the multiplication result register 114.

From the floating point multiplier 112, in addition to H and L, the overflow and underflow information about H, that is, the data OFH indicating that an overflow has occurred by the addition by the exponent part arithmetic unit 201 and stored in a more significant data overflow register 205, and the data UFH indicating that an underflow has occurred by the addition by the exponent part arithmetic unit 201 and stored in a more significant data underflow register 206 are output. Furthermore, the overflow and underflow information about L, that is, the data OFL indicating that an underflow has occurred by the addition by the adder 203 and stored in a less significant data overflow register 208, and the data UFL indicating that an underflow has occurred by the addition by the adder 203 and stored in a less significant data underflow register 209 are output.

The information about the overflow and the underflow is reported to the control unit such as the CPU, etc. after being latched in the conventional arithmetic unit. However, when the product-sum operation of A×B+C is performed by the arithmetic unit, the information is used in the two adding operations. Therefore, a circuit for providing the information at an appropriate timing for the floating point adder 113 is required.

The circuit is configured by four latch registers OF1R 101, OF2R 102, UF1R 106, and UF2R 107, and two selectors 103 and 108.

The two serially connected latch registers OF1R 101 and OF2R 102 latch the OFH and OFL, and the OFS which is the data indicating the overflow in the arithmetic operation by the floating point adder 113. The two serially connected latch registers UF1R 106 and UF2R 107 latch the UFH and UFL, and the UFS which is the data indicating the underflow in the arithmetic operation by the floating point adder 113.

The selector 103 for selecting the overflow information before and after the latch by the OF2R 102, and the selector 108 for selecting the underflow information before and after the latch by the UF2R 107 are controlled by the register control circuit 105.

The fixed-point part of L is not normalized, and the implicit 1 is not processed. Therefore, the value of L is not in the representation form of the IEEE standard, but 65-bit data in all. Accordingly, the RR 111 which is to store the value of L is configured to have the bit width of 65 bits while the result storage register included in the arithmetic unit corresponding to the arithmetic operation of the existing IEEE double-precision floating point numbers normally has the bit width of 64 bits.

Figure 10:
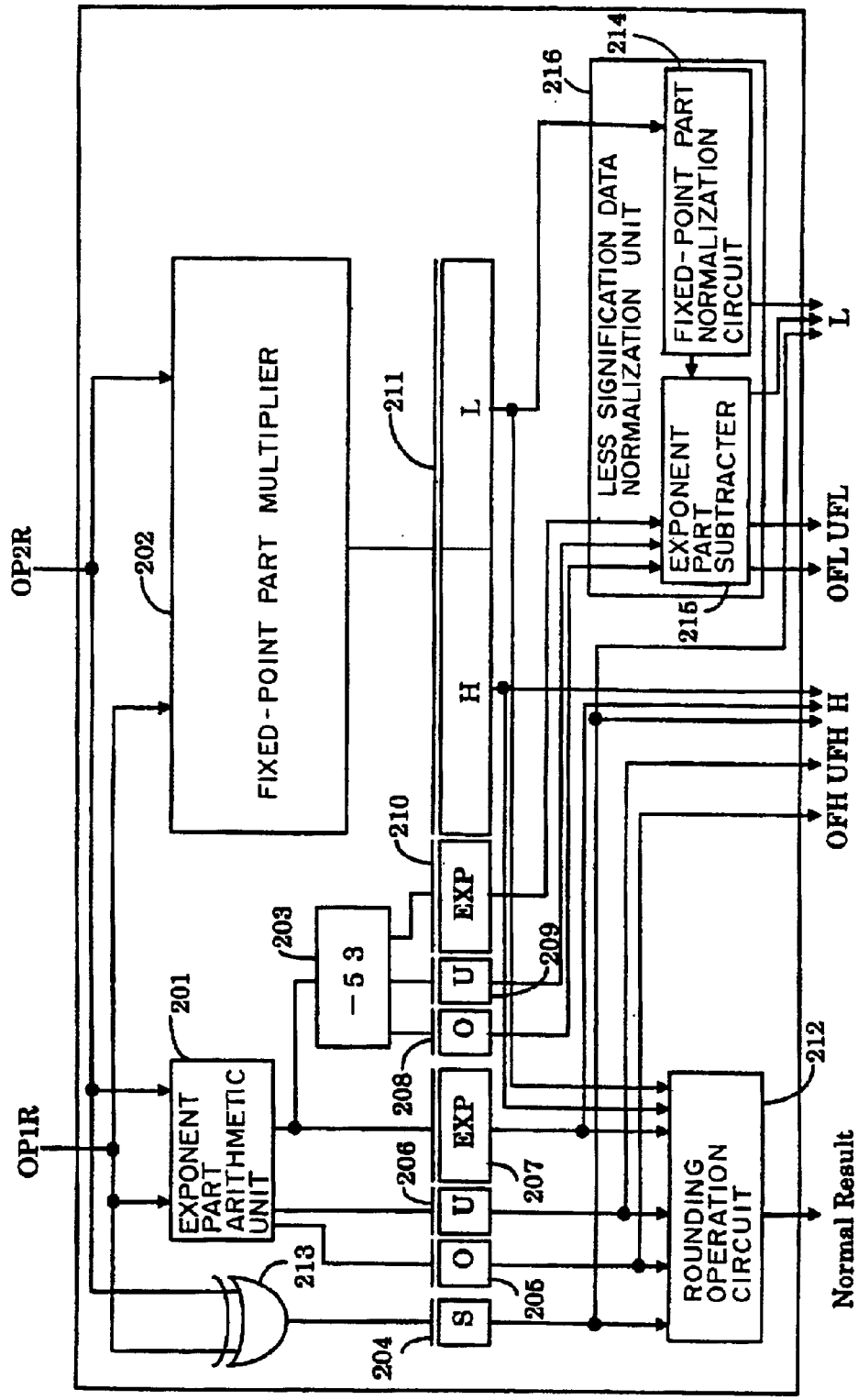
FIG. 10 shows another example of the detailed configuration of the floating point multiplier shown in FIG. 8.

However, instead of 65 bits for the bit width of the RR 111, the floating point multiplier 112 is provided with a less significant data normalization unit 216 comprising a fixed-point part normalization circuit 214 and an exponent part subtracter 215 as shown in FIG. 10 so that the fixed-point part of L can be normalized and the exponent value of L can be amended, and then the value excluding the implicit 1 can be set as the fixed-point value of L in the multiplication result, thereby setting the bit width of the RR 111 to the 64-bit width as in the existing arithmetic unit. At this time, the logical sum of the overflow or the underflow generated by the adder 203 and a exponent part subtracter 402 is output as the data of the OFL and the UFL.

The order of storing H and L output by the floating point multiplier 112 in the RR 111 is first H, and then L because the order in the addition is determined when the product-sum operation of A×B+C is performed by the arithmetic unit in two operations, that is, the order of adding L to C and the order of adding H to C is determined based on the comparison result between H and C. Therefore, as described above, transferring H first to the RR 111 can start the comparison between H and C earlier.

Figure 11:
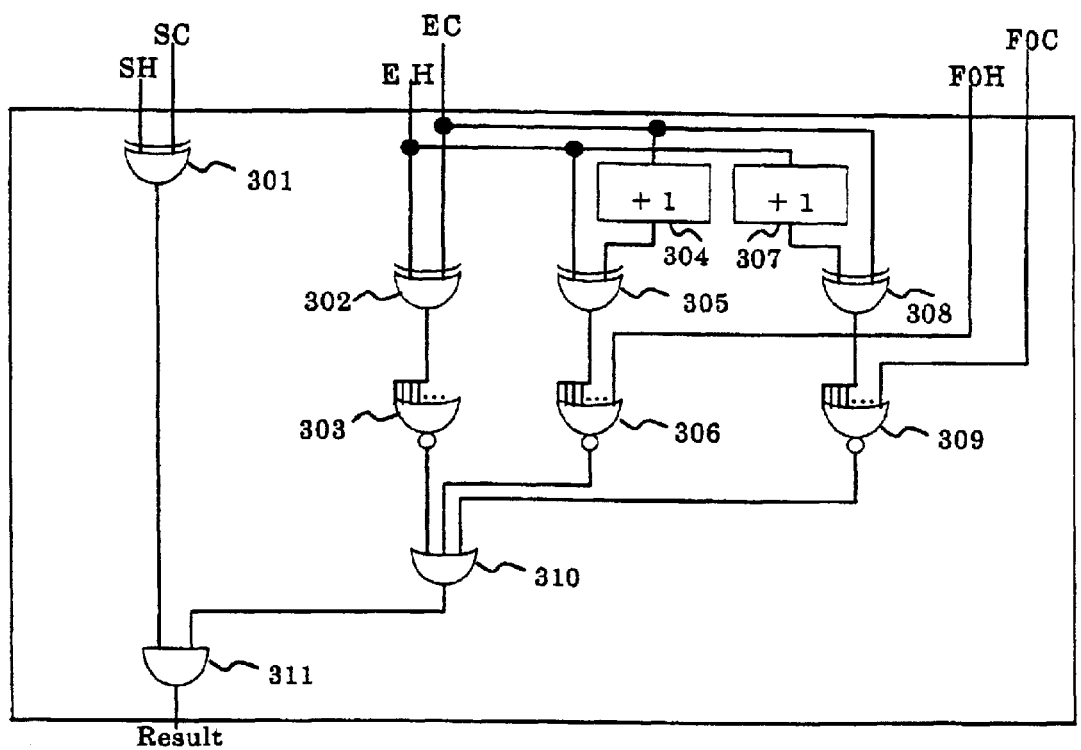
FIG. 11 shows the configuration of a circuit provided in the determination circuit shown in FIG. 8.

A determination circuit 115 is provided with a circuit for determining the adding order based on the comparison result between H and C as shown in FIG. 11.

In FIG. 11, SH and SC are the sign bits of H and C respectively. An Ex-OR 301 determines whether or not the sign bits match each other.

EH and EC are the exponent values of H and C respectively, and an Ex-Or 302 and an NOR 303 determine whether or not all bits of the exponent parts of H and C match. The input portion of the NOR 303 shown in FIG. 11 is provided for each bit of the exponent part of H and C so that all bits can be compared for each bit.

An adder 304 and an adder 307 are circuits for adding 1 to EH and EC. That is, the adder 304, an Ex-OR 305, and an NOR 306 determine whether or not all bits match the value obtained by adding 1 to the exponent value of C and the exponent value of H, and an adder 307, an Ex-OR 308, and an NOR 309 determine whether or not all bits match the value obtained by adding 1 to the exponent value of H and the exponent value of C.

Furthermore, FOH and FOC are the most significant bits of the fixed-point parts of H and C respectively. Therefore, the output of an OR 310 to which the output of the NOR 303, the NOR 306, and the NOR 309 is input indicates the determination result whether or not the signs of H and C are different, the difference between the exponent value of H and the exponent value of C is 1, and the most significant bit of the larger fixed-point part between them is 0.

As described above, the output of an AND 311 to which the output of the Ex-OR 301 and the output of the OR 310 are input is a signal for determining the order of the adding operations performed in two operations on A×B and C.

To allow the determination circuit 115 to determine as described above, the values of H and C are to be stored in any of the OP1R 109, the OP2R 110, and the RR 111.

Back in FIG. 8, OFH and UFH are respectively stored in the OF1R 101 and the UF1R 106 at the same timing as H output from the floating point multiplier 112 stored in the RR 111.

At the next timing, L output from the floating point multiplier 112 is stored in the RR 111, and simultaneously OFL and UFL are stored in the OF1R 101 and the UF1R 106. At this time, H stored in the RR 111 is transferred to the OP2R 110. The data stored in the OF1R 101 and the UF1R 106 is transferred to the OF2R 102 and the UF2R 107 respectively. In addition, at this timing, the determination based on the value of H and the value of C is performed by the determination circuit 115. To attain this, the value of C is stored in the OP1R 109 in advance. Instead, the value of H can be stored in the OP1R 109, and the value of C can be stored in the OP2R 110.

At the next timing, an addition is performed in the order based on the determination result obtained by the determination circuit 115. If it is determined by the determination circuit 115 that the addition of H and C is to be performed first, then the numeric data stored in the OP1R 109 and the numeric data stored in the OP2R 110, that is, C and H, are transferred to the floating point adder 113, and an addition is performed. At this time, the selector 103 and the selector 108 are controlled, and the OFH data stored in the OF2R 102 and the UFH data stored in the UF2R 107 are transferred to the floating point adder 113. Correspondingly, the OFL data stored in the OF1R 101 is transferred to the OF2R 102, and the UFL data stored in the UF1R 106 is transferred to the UF2R 107. At this timing, L stored in the RR 111 is transferred to the OP2R 110.

Since L is stored in the OP2R 110, the OP2R 110 has to be configured to have the bit width of 65 bits if the floating point multiplier 112 is configured as shown in FIG. 9. If the floating point multiplier 112 is configured as shown in FIG. 10, then the OP2R 110 can be configured to have the bit width of 64 bits. The request for the configuration of the OP2R 110 has nothing to do with the determination result of the determination circuit 115.

On the other hand, if it is determined by the determination circuit 115 that the addition of L to C is to be performed first, then L stored in the RR 111 is transferred to the OP2R 110. At the next timing, the numeric data stored in the OP1R 109 and the numeric data stored in the OP2R 110, that is, C and L, are transferred to the floating point adder 113 for an adding operation.

Since the value of H stored in the OP2R 110 is lost at this time, the value of H is to be also stored in a TMPR (temporary register) 104 when H is transferred from the RR 111 to the OP2R 110 at the previous timing.

When C and L are transferred to the floating point adder 113, the selector 103 and the selector 108 are controlled, and the OFL data stored in the OF1R 101 and the UFL data stored in the UF1R 106 are also transferred to the floating point adder 113. At this time, the OFH data stored in the OF2R 102 and the UFH data stored in the UF2R 107 are held as is.

Figure 12:
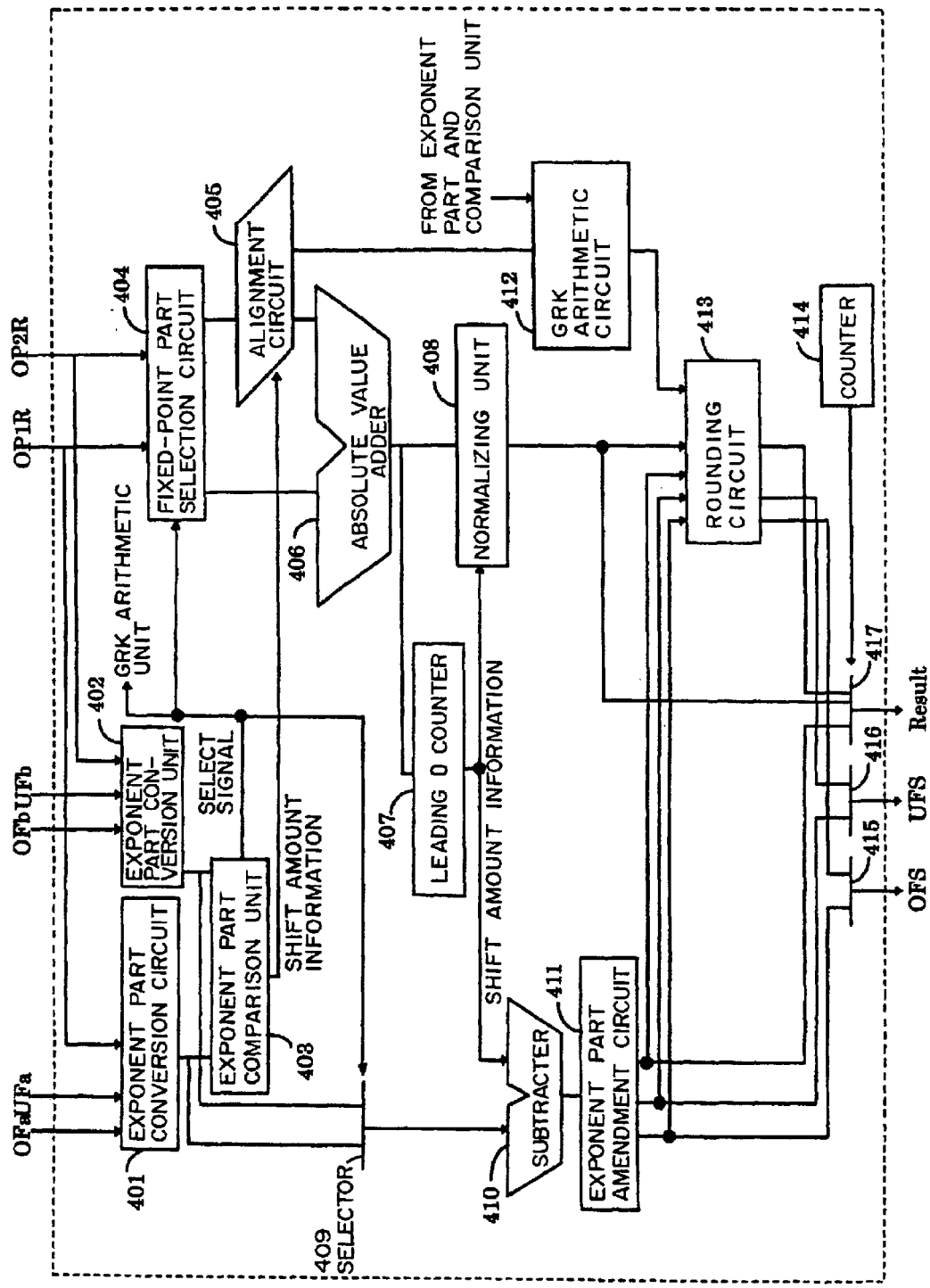
FIG. 12 shows the detailed configuration of the floating point adder shown in FIG. 8.

Described below are the operations shown in FIG. 12. FIG. 12 shows the detailed configuration of the floating point adder 113 shown in FIG. 8.

Exponent part conversion circuits 401 and 402 convert the data of 11-bit exponent values in the numeric data transferred from the OP1R 109 and the OP2R 110 to the floating point adder 113 into 12-bit data using the information about the overflow or underflow generated in the arithmetic operation performed to obtain the numeric data.

FIG. 13 shows the detailed configuration of the exponent part conversion circuits 401 and 402. In FIG. 13, EXP is an exponent value of 11 bits input into the circuit, and OF is a flag indicating the occurrence of an overflow, and UF is a flag indicating the occurrence of an underflow. The 12-bit value which is an addition result by an adder 507 is an output of the circuit.

In FIG. 13, when OF and UF are 0, that is, when no overflow or underflow occurs in the arithmetic operation for obtaining the value of EXP, the value '1024' is input into the adder 507 through AND 503 and OR 506 by the operations of NOT 501 and NOT 502 inverting the logical values of OF and UF respectively, and added to the value of EXP. The value '1024' refers to a value of (−B1+B2) where a biased value B1 of 1023 is assigned to an 11-bit exponent value, and a biased value B2 of 2047 is assigned to a 12-bit exponent value after the conversion. That is, in this case, the circuit shown in FIG. 13 performs the computation using the conversion expression when no overflow or underflow occurs in the above mentioned exponent value conversion expression.

In FIG. 13, when OF is '1' and UF is '0', that is, if an overflow has occurred in the arithmetic operation for obtaining the value of EXP, then the value 2056 is input into the adder 507 through AND 504 and the OR 506, and is added to the value of EXP. In this example, '2056' is a value of (−B1+B2+α) when B1 is 1023 and B2 is 2047 as described above, and the value α(β=$2^α$) starting from the constant β used for amendment of exponent value in the exponent part arithmetic unit 201 and adder 203 (and the exponent part subtracter 215 when the floating point multiplier 112 has the configuration shown in FIG. 10) of the arithmetic unit is '1536'. That is, in this case, the circuit shown in FIG. 13 performs the computation using the conversion expression when an overflow occurs in the above mentioned exponent value conversion expression.

In FIG. 13, when OF is '0' and UF is '1', that is, if an underflow has occurred in the arithmetic operation for obtaining the value of EXP, then the value '−512' is input into the adder 507 through AND 505 and the OR 506, and is added to the value of EXP. In this example, '−512' is a value of (−B1+B2−α) when B1 is 1023 and B2 is 2047 as described above, and the value α is '1536'. That is, in this case, the circuit shown in FIG. 13 performs the computation using the conversion expression when an underflow occurs in the above mentioned exponent value conversion expression.

As described above, the circuit shown in FIG. 13 converts 11-bit exponent value data into 12-bit data by the above mentioned exponent value conversion expression.

Back in FIG. 12, an exponent part comparison unit 403 compares the exponent value data output from the exponent part conversion circuits 401 and 402, and determines which is larger, and computes the difference between them. The exponent part comparison unit 403 performs the function corresponding to the subtracter 1003 in the conventional product-sum operation unit shown in FIG. 2.

The fixed-point part selection circuit 404 outputs a fixed-point value of a larger exponent value after the conversion in the numeric value transferred from the OP1R 109 and the OP2R 110 to the floating point adder 113 to one input of an absolute value adder 406 according to a select signal output from the exponent part comparison unit 403, that is, the signal indicating which value is larger among the converted exponent value data output from the exponent part conversion circuits 401 and 402, and the smaller fixed-point value is output to an alignment circuit 405. A fixed-point part selection circuit 404 performs the function corresponding to the fixed-point part selector 1004 in the conventional product-sum operation unit shown in FIG. 2 the input/output of which can be configured such that the input on the OP1R 109 side can have the bit width of 52 bit, and the input and two outputs on the OP2R 110 side and two output can have the bit width of 53 bits, thereby avoiding an increased circuit. Furthermore, if the floating point multiplier 112 is configured as shown in FIG. 10, all input/output can be configured for the bit width of 52 bits.

The alignment circuit 405 transfers the point of the fixed-point value assigned by the fixed-point part selection circuit 404 according to the shift amount information output from the exponent part comparison unit 403, that is, the difference between two converted exponent values output from the two exponent part conversion circuits 401 and 402, that is, the information about the transfer amount for transfer of the point of the fixed-point value for the smaller converted exponent value of the numeric data transferred from the OP1R 109 and the OP2R 110 to the floating point adder 113, and outputs the transferred fixed-point value to the other input of the absolute value adder 406. The alignment circuit 405 performs the function corresponding to the alignment circuit 1005 shown in FIG. 2, and the input/output can be configured for the bit width of 53 bits (52 bits if the floating point multiplier 112 is configured as shown in FIG. 10).

The absolute value adder 406 performs an adding operation using the bit width of 53 bits on the fixed-point value in the aligned numeric data given from the fixed-point part selection circuit 404 and the alignment circuit 405 and transferred from the OP1R 109 and the OP2R 110 to the floating point adder 113. If the floating point multiplier 112 is configured as shown in FIG. 10, then an adding operation is performed using the bit width of 53 bits with the implicit 1 included. The absolute value adder 406 performs the function corresponding to the absolute value adder 1006 shown in FIG. 2. However, the increase of the circuit components is limited.

A leading 0 counter 407 counts the number of '0' arranged from the most significant bit in the bit string representing the fixed-point value, that is, the arithmetic result from the absolute value adder 406.

A normalizing unit 408 left-shifts the bit string representing a fixed-point value by the number indicated by the shift amount information, that is, the number of bits corresponding to the count value of the leading 0 counter 407 so as to limit the fixed-point value which is an arithmetic result of the absolute value adder 406 in the predetermined range of the normalized number.

Figure 2:
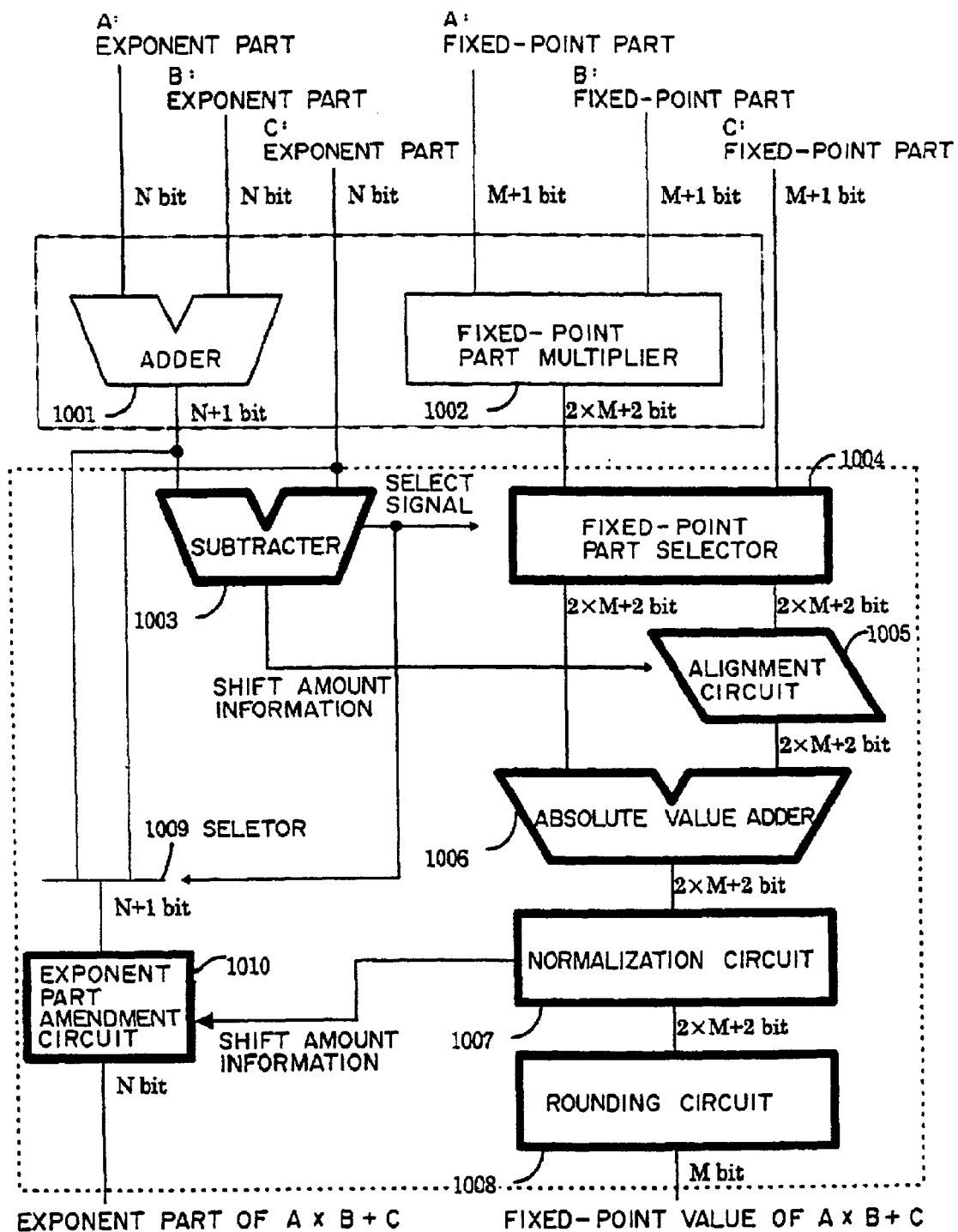
FIG. 2 shows an example of a configuration of a conventional product-sum operation unit.
Figure 3:
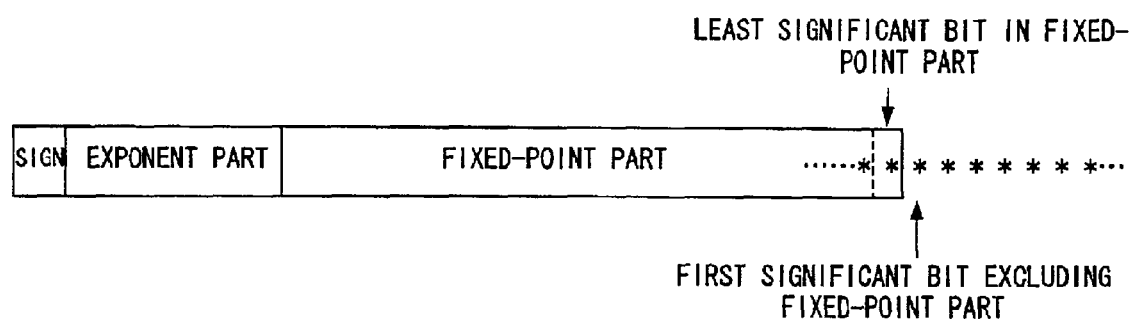
FIG. 3 shows an example of a rounding process.

The leading 0 counter 407 and the normalizing unit 408 are originally provided in the absolute value adder 1006 as shown in FIG. 2. However, since the output of the absolute value adder 406 has the bit width of 53 bits, the circuit can be smaller as compared with the product-sum operation unit shown in FIG. 2.

A selector 409 selects a larger exponent value converted by the exponent part conversion circuits 401 and 404 in the numeric data transferred from the OP1R 109 and the OP2R 110 to the floating point adder 113 according to the select signal output from the exponent part comparison unit 403, that is, a reference exponent value in the addition of fixed-point values performed by the absolute value adder 406, and corresponds to the selector 1009 in FIG. 2.

A subtracter 410 subtracts from the exponent value selected by the selector 409 the value indicated by the shift amount information transferred from the leading 0 counter 407, and compensates the exponent value for the increase of the fixed-point value generated by the left bit shift by the normalizing unit 408.

An exponent part amendment circuit 411 amends the exponent value represented by 12 bits up to the output of the subtracter 410 to the exponent value of 11 bits in accordance with the standard about the double-precision floating point number of IEEE.

Figure 14:
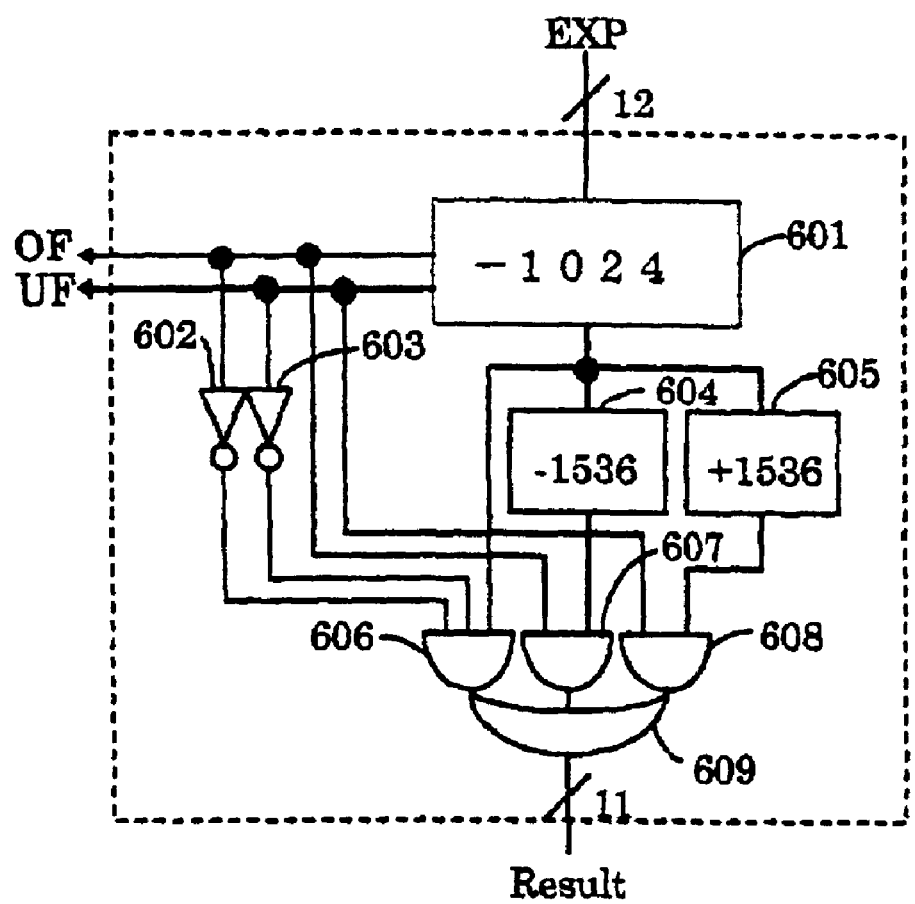
FIG. 14 shows the detailed configuration of the exponent part amendment circuit shown in FIG. 12.

FIG. 14 shows the detailed configuration of the exponent part amendment circuit 411. In FIG. 14, EXP is an exponent value of 12 bits input into the circuit.

First, an exponent value input is added to '−1024' by an adder 601. If an overflow occurs when the value of the addition result is represented by the bit width of 11 bits, then a flag OF indicating the occurrence of an overflow is set and output. If an underflow occurs, then a flag UF indicating the occurrence of an underflow is set and output. Therefore, if the OF and UF are not set by the adder 601 through the operations of an NOT 602 and an NOT 603 for inverting the logical values of the OF and UF respectively, that is, if no overflow or underflow occurs although the value of the addition result by the adder 601 is represented by the bit width of 11 bits, the addition result by the adder 601 is output as an 11-bit exponent value from the circuit through an AND 606 and an OR 609. The value '−1024' refers to a value of (−B1+B2) where a biased value B1 of 2047 is assigned to an 12-bit exponent value, and a biased value B2 of 1023 is assigned to an 11-bit exponent value after the conversion of the exponent value, and the conversion of the exponent value can be performed from 12 bits to 11 bits by adding the value of (−B1+B2) to the value of the EXP as described above.

On the other hand, when the OF is set by the adder 601, that is, if the value of the addition result by the adder 601 is represented by the bit width of 11 bits, and an overflow occurs, then '−1536' is added by an adder 604 to the addition result by the adder 601, and the addition result is output as an 11-bit exponent value from the circuit through an AND 607 and the OR 609. The value '1536' refers to the value of α. That is, if an overflow occurs when the addition result of the value of EXP and the value of (−B1+B2) is represented by the bit width of 11 bits, the circuit outputs the result obtained by subtracting the value of α from the value as an 11-bit exponent value, and also outputs the flag OF indicating the occurrence of the overflow.

When the UF is set by the adder 601, that is, if an underflow occurs when the value of the addition result by the adder 601 is represented by the bit width of 11 bits, then '+1536' is added by an adder 605 to the addition result by the adder 601, and the addition result is output as an 11-bit exponent value from the circuit through an AND 608 and the OR 609. That is, if an underflow occurs when the addition result of the value of EXP and the value of (−B1+B2) is represented by the bit width of 11 bits, the circuit outputs the result obtained by adding the value of α to the value as an 11-bit exponent value, and also outputs the flag UF indicating the occurrence of the underflow.

The subtracter 410 and the exponent part amendment circuit 411 are also provided in the exponent part amendment circuit 1010 as shown in FIG. 2.

Back in FIG. 12, a GRK arithmetic circuit 412 obtains each bit of the above mentioned GRK based on which the contents of the rounding process by a rounding circuit 413 are determined in response to the addition result of the fixed-point values output by the normalizing unit 408.

The rounding circuit 413 performs a rounding process on the fixed-point value output from the normalizing unit 408 based on the value output from the normalizing unit 408 based on the value of each bit of the GRK obtained by the GRK arithmetic circuit 412.

Figure 15:
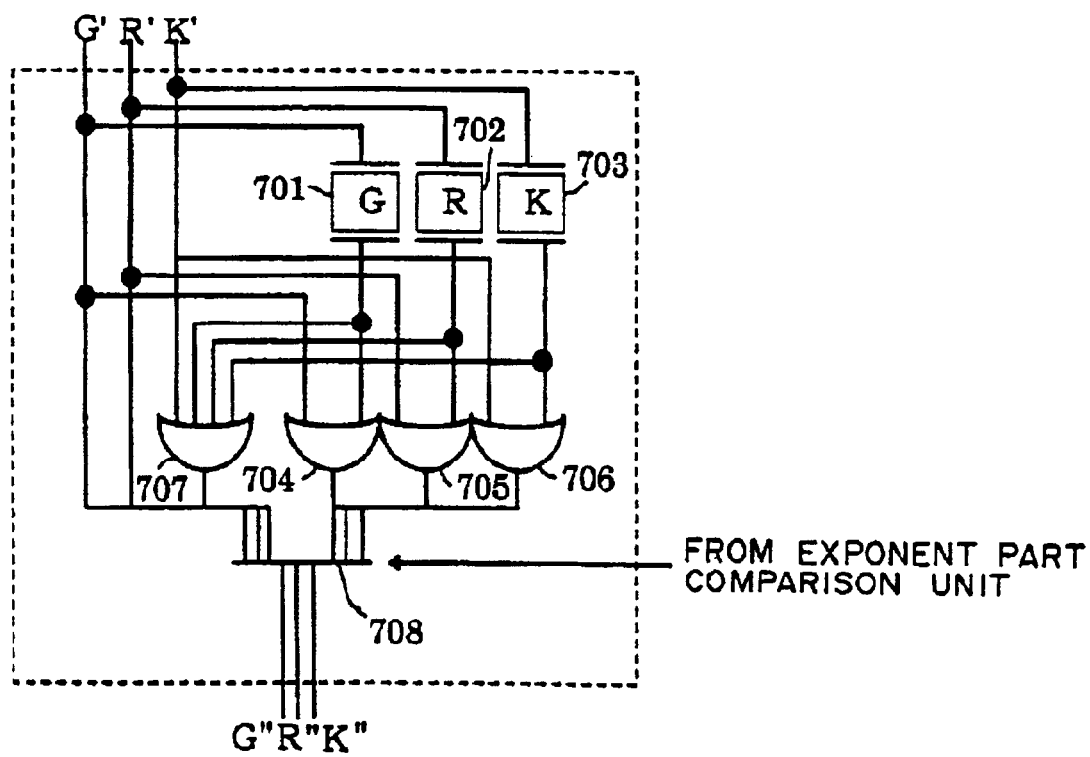
FIG. 15 shows the detailed configuration of the GRK arithmetic circuit shown in FIG. 12.

FIG. 15 shows the detailed configuration of the GRK arithmetic circuit 412. In FIG. 15, G' R' K' are the bits of the GRK generated by the right bit shift performed for alignment by the alignment circuit 405. The exponent part comparison unit 403 inputs a select signal into the circuit. Since the select signal is also used in controlling the data selection by the fixed-point part selection circuit 404, the signal indicates which fixed-point value of the numeric data sequentially transferred from the OP1R 109 and the OP2R 110 to the floating point adder 113 corresponds to the numeric data input to the alignment circuit 405.

Latch registers 701, 702, and 703 temporarily store the value of each bit of GRK output from the alignment circuit 405 when the floating point adder 113 previously performs an addition. The latch registers 701, 702, and 703 are reset when the first addition is started in the two adding operations performed in the product-sum operation of A×B+C. Therefore, when the second addition in the two adding operations is performed, the value of each bit of the GRK output by the alignment circuit 405 is held.

Since the latch registers 701, 702, and 703 operate as described above, the value of each bit of the GRK when the first addition in the two adding operations is performed is defined as G, R, and K, and the value of each bit of the GRK when the second addition in the two adding operations is performed is defined as G', R', and K'. Then, the respective outputs of OR 704, 705, and 706 are G'∪G, R'∪R, and K'∪K.

Therefore, in the second addition in the two adding operations in which L+C is first obtained, the exponent value of the arithmetic result of L+C is larger than the exponent value of H. Therefore, if the outputs of the OR 704, 705, and 706 are output from the GRK arithmetic circuit 412 when the alignment circuit 405 aligns the fixed-point value of H, then the outputs can be the reference values of the rounding process of the rounding circuit 413 as described above.

The fixed-point value of H is a part of the numeric data transferred from the OP2R 110. Therefore, if the select signal output from the exponent part comparison unit 403 switches the fixed-point part selection circuit 404 such that the fixed-point part of the numeric data transferred from the OP2R 110 can be input into the alignment circuit 405, then a selector 708 is configured such that the outputs of the OR 704, 705, and 706 can be output from the GRK arithmetic circuit 412.

On the other hand, when the exponent value of H is larger than the exponent value of the arithmetic result of L+C in the second addition in the two adding operations performed by first obtaining L+C, the alignment circuit 405 outputs each bit of GRK obtained by aligning the fixed-point value of the arithmetic result of L+C. Therefore, as for the bits of the GRK based on which the rounding process is performed by the rounding circuit 413, the output of the alignment circuit 405 can be used as the bits for G and R. As the K bit, the logical sum of the K bit output by the alignment circuit 405 and all less significant bits discarded in the previously performed adding operation of L+C, that is, the logical sum of the K bit output by the alignment circuit 405 and the GRK in the previously performed adding operation held in the latch registers 701, 702, and 703, can be used.

That is, the selector 708 is configured such that, if the select signal output by the exponent part comparison unit 403 is a signal for switching the fixed-point part selection circuit 404 such that the fixed-point part of the numeric data transferred from the OP1R 109, that is, the fixed-point value of the arithmetic result of L+C, can be input into the alignment circuit 405, then the G and R bits in the bits transmitted from the alignment circuit 405 are output as is, and, as the K bit, the output of an OR 707 obtained by inputting the K bit and each bit of the GRK in the previously performed adding operation held in the latch registers 701, 702, and 703 into the OR 707.

When two adding operations are performed by first adding H to C, GRK do not occur in the first addition of H+C as described above, no bit of GRK is input into the latch registers 701, 702, and 703. In this case, the value of each bit of GRK output by the GRK arithmetic circuit 412 shown in FIG. 15 is the value of each bit of the GRK input into the circuit whichever the selector 708 is switched.

The rounding circuit 413 performs a rounding process on the fixed-point value output from the normalizing unit 408 based on the value of each bit of the GRK obtained by the GRK arithmetic circuit 412 as described above.

A counter 414 counts the frequency of the addition performed in the floating point adder 113, and determines whether the addition just performed is the first addition or the second addition in the two adding operations performed in the product-sum operation of A×B+C.

Based on the determination result of the counter 414, selectors 415, 416, and 417 output an addition result using an 11-bit output from the exponent part amendment circuit 411 as an exponent value, and using a 52-bit value excluding the implicit 1 from the output of the normalizing unit 408 as a fixed-point value if the addition just performed is the first addition in the two adding operations performed in the product-sum operation of A×B+C, and simultaneously output the flags OF and UF output from the exponent part amendment circuit 411 as an OFS and an UFS. On the other hand, selectors 415, 416, and 417 output an addition result using an 11-bit value obtained by adding an amendment by the rounding circuit 11 as necessary to the output from the exponent part amendment circuit 411 as an exponent value, and using a 52-bit value excluding the implicit 1 from the fixed-point value rounded and output by the rounding circuit 413 as a fixed-point value if the addition just performed is the first addition in the two adding operations performed in the product-sum operation of A×B+C, and simultaneously output the flags OF and UF output from one or both of the exponent part amendment circuit 411 and the rounding circuit 413 as an OFS and an UFS.

The arithmetic unit shown in FIG. 8 performs the product-sum operation of A×B+C on the double-precision floating point numbers A, B, and C as described above.

The execution of multiplications and additions by the arithmetic unit described above, and the transmission and reception of data are managed by an operation control unit 116 for controlling the operations of each unit of the arithmetic unit shown in FIG. 8. The operation control unit 116 is configured by a wired logic to realize the management through hardware, or is provided with a central processing unit for executing a micro code instruction or firmware to realize the management. Instead of providing the operation control unit 116, the management of the operations can be performed by an external device to the arithmetic unit shown in FIG. 8.

Figure 16:
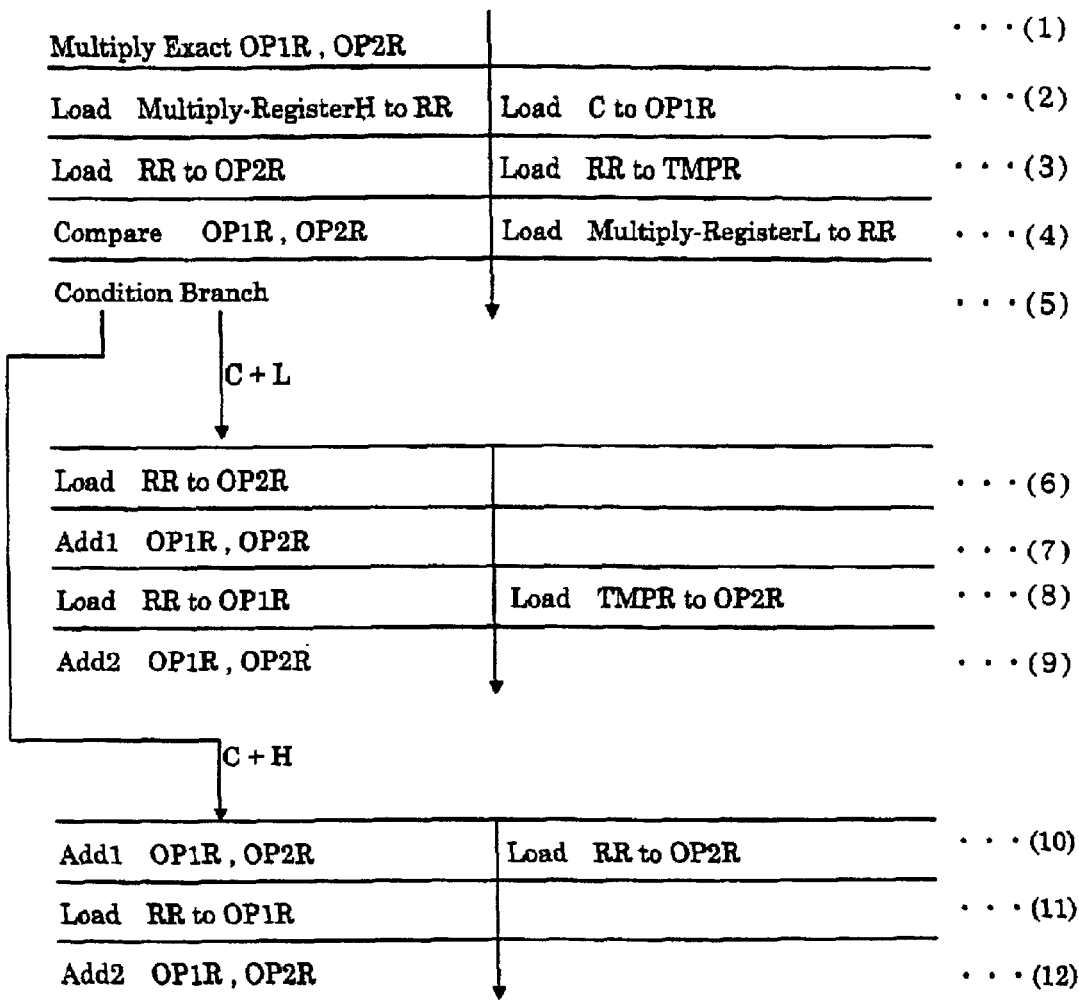
FIG. 16 shows an example of a control program for an arithmetic unit shown in FIG. 8 performing a product-sum operation.

FIG. 16 shows an example of a control program described using a pseudo-instruction code used when operations are managed by software.

The control program shown in FIG. 16 is started with the value of A in the product-sum operation A×B+C stored in the OP1R 109, and the value of B stored in the OP2R 110.

In FIG. 16, (1) shows allowing the floating point multiplier 112 to perform the multiplication for correctly computing the fixed-point part of each value stored in the OP1R 109 and the OP2R 110, that is, the multiplication without rounding the less significant portion of an arithmetic result.

(2) shows the transmission of the H (more significant) portion in the multiplication result register 114 storing the multiplication result obtained in (1) above to the RR 111, and the storage of the value of C in the OP1R 109.

(3) shows the simultaneous transmission of the value stored in the RR 111, that is, the value of H in the multiplication result obtained in (1) above simultaneously to the OP2R 110 and the TMPR 104.

(4) shows allowing the determination circuit 115 to compare the values stored in the OP1R 109 and the OP2R 110, that is, the value C with the value H, and transmitting the L (less significant) portion in the multiplication result register 114 storing the multiplication result obtained in (1) above to the RR 111.

(5) shows branching the process to (6) if it is determined based on the determination result of the determination circuit 115 in (4) above that the addition C+L is to be performed first, and branching the process to (10) if it is determined that the addition C+H is to be performed first.

(6) shows the transmission of the value stored in the RR 111, that is, the value of L obtained as a multiplication result in (1) above to the OP2R 110.

(7) shows allowing the floating point adder 113 to add the values stored in the OP1R 109 and the OP2R 110, that is, the value of C to the value of L. The result of the addition by the floating point adder 113 is automatically transferred to and stored in the RR 111.

(8) shows the transfer of the value stored in the RR 111, that is, the addition result of the values of C and L, to the OP1R 109, and the transfer of the value stored in the TMPR 104, that is, the value of H, to the OP2R 110.

(9) shows allowing the floating point adder 113 to add the values stored in the OP1R 109 and the OP2R 110, that is, the addition result of C+L to the value of H. The value then stored in the RR 111 is the value of the result of the product-sum operation of A×B+C.

(10) shows allowing the floating point adder 113 to add the values stored in the OP1R 109 and the OP2R 110, that is, the value of C and the value of H, and simultaneously transferring the value stored in the RR 111, that is, the value of L transferred to the RR in (4) above, to the OP2R 110.

(11) shows the transmission of the value stored in the RR 111, that is, the value of C+H which is an addition result obtained in (10) above, to the OP1R 109.

(12) shows allowing the floating point adder 113 to add the values stored in the OP1R 109 and the OP2R 110, that is, the addition result of C+H to the value of L. The value then stored in the RR 111 is the value of the result of the product-sum operation of A×B+C.

The program shown in FIG. 16 shows the contents of the above mentioned instructions, and the product-sum operation of A×B+C is performed with high precision by the arithmetic unit shown in FIG. 8 operating according to the instructions described in the control program.

As described above, to perform a product-sum operation by adding third data which is floating point number data in which a floating point number is represented by a bit string to a product of first data and second data which are floating point number data, the present invention divides a bit string representing a fixed-point part in multiplication result data which is a multiplication result of the first data and the second data into a portion representing more significant digits in the fixed-point part and a portion representing less significant digits in the fixed-point part, first adds less significant digit multiplication result data having a bit string representing the less significant digits as a fixed-point part to the third data, and then adds the addition result to more significant digit multiplication result data having a bit string representing the more significant digits as a fixed-point part, and performs a rounding process on a later addition result, thereby obtaining data as a result of the product-sum operation.

Thus, an adder can be realized with a smaller circuit as compared with the configuration in which a multiplication result is input into an adder with the bit width as is, and the bit width of a but for transferring data from the multiplier to the adder can be reduced, thereby avoiding enlarging the circuit scale.

Furthermore, the less significant portion of the third data which can be lost by the alignment of the fixed-point part performed during the addition when the data having more significant digits in a fixed-point part of a multiplication result as a fixed-point part is first added to the third data can be protected from being lost, thereby maintaining satisfactory operation precision.

As described above, the present invention can realize an arithmetic unit capable of performing a floating point number product-sum operation with satisfactory operation precision with a smaller increase of circuit components.

What is claimed is:

1. An apparatus for performing a product-sum operation by multiplying and adding floating point number data representing a floating point number using a bit string, comprising:

a multiplication unit performing a multiplication on the floating point number data;

an addition unit performing an addition on the floating point number data;

a rounding unit performing a rounding process on the floating point number data obtained as a result of the addition performed by said addition unit;

a result storage unit storing a result of the product-sum operation by adding third data which is floating point number data to a product of first data and second data which are floating point number data;

a multiplication control unit allowing said multiplication unit to compute multiplication result data which is a result of the multiplication of the first data and the second data;

a first addition control unit allowing said addition unit to compute first addition result data obtained by adding the third data to less significant digit multiplication result data having a fixed-point part formed by a bit string representing the less significant digits in two divisions obtained by dividing a bit string representing the fixed-point part of the multiplication result data into more significant digits and less significant digits; and a second addition control unit allowing said addition unit to compute second addition result data obtained by adding more significant digit multiplication result data having a fixed-point part formed by a bit string representing more significant digits to the first addition result data, wherein said result storage unit stores first product-sum operation result data which is floating point number data obtained by said rounding unit performing a rounding process on the second addition result data.

2. The apparatus according to claim 1, wherein
a representation form of the floating point number data is based on an IEEE-754 Standard which is a standard for a binary floating point arithmetic operation of IEEE (the Institute of Electrical and Electronics Engineers, Inc.).

3. The apparatus according to claim 1, further comprising:
a third addition control unit allowing said addition unit to compute third addition result data obtained by adding the third data to the more significant digit multiplication result data;
a fourth addition control unit allowing said addition unit to compute fourth addition result data obtained by adding the less significant digit multiplication result data to the third addition result data; and
a comparison unit comparing the more significant digit multiplication result data with the third data, wherein
said result storage unit stores second product-sum operation result data which is floating point number data obtained by said rounding unit performing a rounding process on the fourth addition result data in place of the first product-sum operation result data based on the comparison result obtained by said comparison unit.

4. The apparatus according to claim 3, wherein
said result storage unit stores the first product-sum operation result data when the comparison result from said comparison unit indicates that the more significant digit multiplication result data matches the third data in sign.

5. The apparatus according to claim 3, wherein
when said comparison result from said comparison unit indicates that the more significant digit multiplication result data is different from the third data in sign, and when the comparison result indicates that the value of the exponent part represented by the more significant digit multiplication result data matches the value of the exponent part of the third data, the second product-sum operation result data is stored in said result storage unit.

6. The apparatus according to claim 3, wherein
when the comparison result from said comparison unit indicates that the more significant digit multiplication result data is different from the third data in sign, and when the difference between the value of the exponent part represented by the more significant digit multiplication result data and the value of the exponent part of the third data is 1, and the most significant bit of the bit string representing the fixed-point part having a larger value of an exponent part in the more significant digit multiplication result data and the third data is 0, the second product-sum operation result data is stored in said result storage unit.

7. The apparatus according to claim 3, wherein
when the comparison result from said comparison unit indicates that the more significant digit multiplication result data is different from the third data in sign, and when the comparison result indicates that the value of the exponent part represented by the more significant digit multiplication result data matches the value of the exponent part of the third data, or when the difference between the value of the exponent part represented by the more significant digit multiplication result data and the value of the exponent part of the third data is 1, and the most significant bit of the bit string representing the fixed-point part having a larger value of an exponent part in the more significant digit multiplication result data and the third data is 0, the second product-sum operation result data is stored in said result storage unit.

8. The apparatus according to claim 1, further comprising
an exponent part conversion unit converting by extending the number of bits assigned for representation of an exponent part in floating point number data indicating a result of a multiplication by said multiplication unit or a result of an addition by said addition unit according to the information indicating that an overflow or an underflow has occurred in the multiplication or the addition, wherein
when an addition target processed by said addition unit is data indicating the result of the multiplication performed by said multiplication unit or the result of the addition performed before by said addition unit, said addition unit adds the data assuming that the value obtained after the conversion by said exponent part conversion unit is the value of the exponent part in the data.

9. The apparatus according to claim 1, wherein:
said addition unit outputs rounding process information which is information based on which the rounding process can be performed by said rounding unit to the floating point number data obtained by a result of an addition performed by said addition unit together with the addition result; and
said rounding unit performs the rounding process according to first rounding information output when said addition unit computes the first addition result data and second rounding information output when said addition unit computes the second addition result data when the rounding process is performed on the second addition result data.

10. The apparatus according to claim 1, wherein:
said rounding information has in values of any fixed-point part in two pieces of floating point number data to be added by said addition unit, a guard bit which is the most significant bit in the bit string rounded down in the alignment performed when the values of the fixed-point parts are added; a round bit which is a second significant bit preceded by the most significant bit; and a sticky bit indicating a logical sum of all bits subsequent to the second significant bit; and
said rounding unit performs the rounding process based on a logical sum of the guard bit in first rounding information and the guard bit in second rounding information, a logical sum of the round bit in the first rounding information and the round bit in the second rounding information, and a logical sum of the guard bit, the round bit, and the sticky bit of the first rounding information and the sticky bit of the second rounding information when the rounding process is performed on the second addition result data.

11. An apparatus for performing a product-sum operation by multiplying and adding floating point number data representing a floating point number using a bit string, comprising:
multiplication means for performing a multiplication on the floating point number data;
addition means for performing an addition on the floating point number data;
rounding means for performing a rounding process on the floating point number data obtained as a result of the addition performed by said addition means;
result storage means for storing a result of the product-sum operation by adding third data which is floating point number data to a product of first data and second data which are floating point number data;

multiplication control means for allowing said multiplication means to compute multiplication result data which is a result of the multiplication of the first data and the second data;

first addition control means for allowing said addition means to compute first addition result data obtained by adding the third data to less significant digit multiplication result data having a fixed-point part formed by a bit string representing the less significant digits in two divisions obtained by dividing a bit string representing the fixed-point part of the multiplication result data into more significant digits and less significant digits; and second addition control means for allowing said addition means to compute second addition result data obtained by adding more significant digit multiplication result data having a fixed-point part formed by a bit string representing more significant digits to the first addition result data, wherein said result storage means stores first product-sum operation result data which is floating point number data obtained by said rounding means performing a rounding process on the second addition result data.

12. A method for performing a product-sum operation by adding third data which is floating point number data to a product of first data and second data which are floating point number data representing a floating point number by a bit string, comprising:

allowing a multiplication unit multiplying floating point number data to multiply first data by second data;

allowing an addition unit to add floating point number data by adding the third data to less significant digit multiplication result data having as a fixed-point part a bit string representing less significant digits in two divisions obtained by dividing a bit string representing a fixed-point part of more significant digit multiplication result data obtained as a result of the multiplication into two divisions, that is, a bit string indicating more significant digits and less significant digits;

allowing the addition unit to compute the second addition result data obtained by adding more significant digit multiplication result data having as a fixed-point part the bit string representing more significant digits to the first addition result data which is a result of the addition; and obtaining as a result of the product-sum operation the data obtained by performing a rounding process on the second addition result data.

* * * * *